US012671197B2

(12) United States Patent
Huang et al.

(10) Patent No.: US 12,671,197 B2
(45) Date of Patent: Jun. 30, 2026

(54) FLOATING ELECTRICAL CONNECTOR

(71) Applicant: Amphenol Commercial Products (Chengdu) Co., Ltd., Chengdu (CN)

(72) Inventors: Peng Huang, Chengdu (CN); Luyun Yi, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 363 days.

(21) Appl. No.: 18/324,288

(22) Filed: May 26, 2023

(65) Prior Publication Data

US 2023/0396008 A1 Dec. 7, 2023

(30) Foreign Application Priority Data

Jun. 1, 2022 (CN) ......................... 202210621005.0
Jun. 1, 2022 (CN) ......................... 202221376923.3

(51) Int. Cl.

*H01R 12/00* (2006.01)
*H01R 12/72* (2011.01)
*H01R 12/73* (2011.01)
*H01R 13/24* (2006.01)
*H01R 12/71* (2011.01)

(52) U.S. Cl.

CPC ........... *H01R 12/73* (2013.01); *H01R 12/721* (2013.01); *H01R 13/2492* (2013.01); *H01R 12/714* (2013.01)

(58) Field of Classification Search

CPC .. H01R 12/73; H01R 12/721; H01R 13/2492; H01R 12/714; H01R 13/512
See application file for complete search history.

(56) References Cited

U.S. PATENT DOCUMENTS 4,759,729 A * 7/1988 Kemppainen .......... H01R 24/50 439/580
7,331,809 B2 * 2/2008 Lee .................... H01R 12/7011 439/377
7,651,372 B2 1/2010 Matsuzaki et al.
8,007,303 B2 * 8/2011 Yao ...................... H01R 12/721 439/153
8,113,884 B2 2/2012 Matsuzaki et al.
(Continued)

FOREIGN PATENT DOCUMENTS

JP 2019-021389 A 2/2019

*Primary Examiner* — Timothy J Thompson
*Assistant Examiner* — Aditya Sharma
(74) *Attorney, Agent, or Firm* — Wolf, Greenfield & Sacks, P.C.

(57) ABSTRACT

A floating connector is provided. The connector has a mating interface configured to move so as to align with a mating component. The connector has a housing having the mating interface. Conductors held by the housing may have mating contact portions adjacent the mating interface for connecting to the mating component when inserted into the mating interface. The connector may have a frame configured to be fixed to a board to which the connector is mounted. The housing is configured to be movable in the frame. The connector may have elastic positioning members disposed between the housing and the frame, such that the elastic positioning members enable the housing to move within the frame for properly aligning the mating interface with a mating component and bias the housing to return to an initial position when the mating component is removed.

20 Claims, 13 Drawing Sheets

(56) References Cited

U.S. PATENT DOCUMENTS

| | | | | |
|---|---|---|---|---|
| 8,460,010 | B2 * | 6/2013 | Kimura | H01R 13/2492 439/66 |
| 9,022,811 | B2 | 5/2015 | Takaki | |
| 9,033,722 | B2 | 5/2015 | Kobayashi et al. | |
| 9,033,743 | B2 | 5/2015 | Kobayashi et al. | |
| 9,088,113 | B2 | 7/2015 | Funayama et al. | |
| 9,160,122 | B2 | 10/2015 | Sato | |
| 9,178,326 | B2 | 11/2015 | Funayama et al. | |
| 9,209,557 | B2 | 12/2015 | Kobayashi et al. | |
| 9,225,089 | B2 | 12/2015 | Sato | |
| 9,246,283 | B2 | 1/2016 | Sato | |
| 9,281,594 | B2 | 3/2016 | Funayama et al. | |
| 9,287,654 | B2 | 3/2016 | Takaki | |
| 9,397,432 | B2 | 7/2016 | Yukutake et al. | |
| 9,407,024 | B2 | 8/2016 | Wu et al. | |
| 9,466,907 | B2 | 10/2016 | Sakaue et al. | |
| 9,478,889 | B2 * | 10/2016 | Oshida | H01R 13/6585 |
| 9,490,559 | B2 | 11/2016 | Takane | |
| 9,627,822 | B2 | 4/2017 | Hori | |
| 9,698,508 | B2 | 7/2017 | Kobayashi et al. | |
| 9,698,509 | B2 | 7/2017 | Ashibu | |
| 9,799,971 | B2 | 10/2017 | Ninomiya et al. | |
| 9,876,295 | B2 | 1/2018 | Hori | |
| 9,876,297 | B2 | 1/2018 | Takane | |
| 9,941,614 | B2 | 4/2018 | Sato | |
| 9,997,854 | B2 | 6/2018 | Kobayashi et al. | |
| 10,074,937 | B2 | 9/2018 | Ninomiya et al. | |
| 10,128,614 | B2 | 11/2018 | Suzuki et al. | |
| 10,193,260 | B1 | 1/2019 | Suzuki et al. | |
| 2018/0077323 | A1 | 3/2018 | Sakamoto | |
| 2018/0145436 | A1 | 5/2018 | Doi et al. | |
| 2018/0145467 | A1 * | 5/2018 | Doi | H01R 24/60 |
| 2018/0159257 | A1 * | 6/2018 | Sakamoto | H01R 13/113 |
| 2018/0166483 | A1 | 6/2018 | Sakamoto et al. | |
| 2018/0183162 | A1 | 6/2018 | Sakamoto | |
| 2018/0198234 | A1 | 7/2018 | Takane | |
| 2018/0351297 | A1 | 12/2018 | Suzuki et al. | |
| 2019/0020134 | A1 * | 1/2019 | Suzuki | H01R 12/55 |
| 2020/0343660 | A1 * | 10/2020 | Gondo | H01R 12/57 |
| 2021/0399455 | A1 | 12/2021 | Wang et al. | |

* cited by examiner

200

FLOATING ELECTRICAL CONNECTOR

RELATED APPLICATIONS

This application claims priority to and the benefit of Chinese Patent Application Serial No. 202210621005.0, filed on Jun. 1, 2022. This application also claims priority to Chinese Patent Application Serial No. 202221376923.3, filed on Jun. 1, 2022. The contents of these applications are incorporated herein by reference in their entirety.

FIELD

This application relates to interconnection systems, such as those including electrical connectors, configured to interconnect electronic assemblies.

BACKGROUND

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards is to have one printed circuit board serve as a mainboard. Other printed circuit boards, called "daughter boards" or "daughter cards," may be connected through the mainboard.

A known mainboard has the form of a printed circuit board onto which many connectors may be mounted. Conductive traces in the mainboard may be electrically connected to signal conductors in the connectors so that signals may be routed between the connectors. Daughter cards may also have connectors mounted thereon. The connectors mounted on a daughter card may be plugged into the connectors mounted on the mainboard. In this way, signals may be routed among the daughter cards through the mainboard. In present applications, there is a trend to mount add-in cards, such as a graphics card or a solid state disk, directly to the electrical connectors of the mainboard, thereby facilitating expanding the functions of an electronic device and optimizing the performances of the electronic device.

BRIEF SUMMARY

Aspects of the present application relate to floating electrical connectors.

Some embodiments relate to an electrical connector. The electrical connector may comprise a frame comprising a first opening and a second opening; a housing movably disposed in the frame, the housing comprising a mounting face and a mating face having a slot exposed by the first opening; and a plurality of conductors held by the housing, each of the plurality of conductors having a mating end extending to the slot and a conductor tail extending out of the mounting face and exposed by the second opening.

Optionally, the frame may comprise a first surface; the first opening may be in the first surface; and the first surface may be configured to restrict movements of the housing with respect to the first opening.

Optionally, the frame may comprise an inner wall having a limiting surface; the housing may have an adapting portion; and the adapting portion and the limiting surface are configured to restrict movements of the housing with respect to the second opening.

Optionally, the conductor tails of the plurality of conductors may be flexible.

Optionally, the electrical connector may comprise a positioning member disposed between the housing and the frame, wherein: the housing may comprise a side surface having a positioning member receiver; and the positioning member may be disposed in the positioning member receiver.

Optionally, the positioning member receiver may comprise a pair of protrusions spaced apart, the pair of protrusions having respective grooves opposite to each other; and the positioning member may comprise a mounting portion, an abutting portion, and a connecting portion, the mounting portion and the abutting portion connected by the connecting portion, two sides of the mounting portion inserted into the slots respectively, the abutting portion facing the frame.

Optionally, the electrical connector may comprise a second positioning member receiver comprising a pair of protrusions spaced apart and a reinforcing groove disposed between the pair of protrusions, the pair of protrusions having respective grooves opposite to each other; and a second positioning member including a mounting portion having a reinforcing opening, an abutting portion, and a connecting portion, the mounting portion and the abutting portion connected by the connecting portion, two sides of the mounting portion inserted into the grooves respectively, the abutting portion facing the frame, wherein: an edge of the reinforcing opening may be disposed in the reinforcing groove.

Optionally, the frame may comprise a first frame and a second frame; the first frame and the second frame may enclose a mounting cavity configured for accommodating the housing; the first opening may be in the first frame; the second opening may be in the second frame; and an inner sidewall of the second frame may protrude more into the mounting cavity than an inner sidewall of the first frame such that the limiting surface may be formed by an end surface of the second frame facing the first frame.

Optionally, the end surface of the second frame may comprise a latch; and the first frame may comprise a hole configured to engage the latch.

Some embodiments relate to an electrical connector. The electrical connector may comprise a frame comprising a first opening and a second opening; a housing comprising a mating face exposed by the first opening, and a mounting face exposed by the second opening; a plurality of conductors held by the housing, each of the plurality of conductors having a mating end extending adjacent the mating face and a conductor tail extending out of the mounting face and exposed by the second opening; and an elastic positioning member disposed between the housing and the frame.

Optionally, the frame may comprise an upper frame having the first opening and a lower frame having the second opening; the upper frame and the lower frame may be configured to be separable; the upper frame may have an upper mounting recess; the lower frame may have a lower mounting recess; the upper mounting recess and the lower mounting recess together may form a mounting cavity; and the housing may be disposed in the mounting cavity.

Optionally, a mouth of the lower mounting recess may have a smaller size than that of the upper mounting recess such that the housing may be supported by an edge of the lower frame.

Optionally, a lower end of the elastic positioning member may abut against the edge of the lower frame.

Optionally, a positioning member receiver may be disposed on a side surface of the housing; the elastic positioning member may be disposed in the positioning member receiver; and the positioning member receiver may be configured to limit the elastic positioning member from moving upwards.

Optionally, the positioning member receiver may comprise a pair of protrusions spaced apart; the pair of protrusions may comprise respective grooves opposite to each other; and the elastic positioning member may comprise a mounting portion, an abutting portion, and a connecting portion, the mounting portion and the abutting portion connected by the connecting portion, two sides of the mounting portion inserted into the grooves respectively, the abutting portion facing the upper frame.

Optionally, the mounting portion may be mounted to the grooves in an upward direction; a limiting barb may be disposed between the pair of protrusions; and the mounting portion may comprise a barb slot configured to engage the limiting barb such that the limiting barb may limit the mounting portion from moving downward.

Some embodiments relate to an electronic assembly. The electronic assembly may comprise a circuit board; and an electrical connector comprising: a frame mounted on the circuit board; a housing movably disposed in the frame, the housing comprising a mounting face and a mating face; and a plurality of conductors held by the housing, each of the plurality of conductors having a mating end extending adjacent the mating face and a conductor tail extending out of the mounting face.

Optionally, the conductor tails of the plurality of conductors may have a length that allows the housing to move in the frame.

Optionally, the electrical connector may comprise a plurality of positioning members disposed between the housing and the frame; and the plurality of positioning members may be elastic.

Optionally, the electronic assembly may comprise a card fixedly mounted on the circuit board at a location separate from the frame, the card comprising an edge inserted through the mating face of the housing.

Some embodiments relate to a floating connector. The floating connector may comprise a frame having a first opening and a second opening, a housing having an mating face and a mounting face, an elastic positioner located between the housing and the frame in the lateral direction and a plurality of conductors held by the housing. The housing may be movably arranged in the frame in a lateral direction parallel to the mating face. The mating face may be provided with an interface which may be configured for engaging with an electronic assembly to be connected to the floating connector. The interface exposed by the first opening. The elastic positioner may be elastically deformable when the housing moves relative to the frame. The plurality of conductors may be held by the housing. Each of the plurality of conductors may have a mating end extending to the interface and a conductor tail extending to the mounting face and exposed by the second opening.

Optionally, the first opening may be configured to completely expose the interface when the housing moves within a maximum moveable range relative to the frame.

Optionally, the frame may comprise a first surface. The first opening may be arranged in the first surface, and the first surface may restrict the housing from separating with the frame through the first opening.

Optionally, an inner sidewall of the frame may be provided with a limiting surface, the housing may be provided with an adapting portion, and the adapting portion may be cooperated with the limiting surface to restrict the housing from separating with the frame through the second opening.

Optionally, the elastic positioner may abut against the limiting surface.

Optionally, a positioning member receiver may be arranged on the side surface of the housing, and the elastic positioner may be mounted to the housing by the positioning member receiver.

Optionally, the positioning member receiver may comprise a first positioning member receiver including a pair of protrusions spaced apart, the pair of protrusions may be respectively provided with slots opposite to each other. The elastic positioner may comprise a first elastic positioning member including a mounting portion, an abutting portion and a connecting portion. The mounting portion and the abutting portion may be connected at two ends of the Connecting portion, two sides of the mounting portion may be inserted into the slots respectively, and the abutting portion faces the frame.

Optionally, the lateral direction may comprise a first lateral direction parallel to a width direction of the mating face, and the first positioning member receiver may be arranged on a first side surface of the housing extending in the first lateral direction.

Optionally, the housing may have two first side surfaces, the two first side surfaces may be opposite in a second lateral direction perpendicular to the first lateral direction, and each of the two first side surfaces may be provided with the first positioning member receiver.

Optionally, the positioning member receiver may comprise a second positioning member receiver including a pair of protrusions spaced apart, the pair of protrusions may be respectively provided with grooves opposite to each other. The elastic positioner may comprise a second elastic positioning member including a mounting portion, an abutting portion and a connecting portion, the mounting portion and the abutting portion may be connected at two ends of the connecting portion, two sides of the mounting portion may be inserted into the grooves respectively, the abutting portion faces the frame. A reinforcing groove may be arranged in interspace between the pair of protrusions, a reinforcing opening may be arranged in the mounting portion, an edge of the reinforcing opening gets stuck in the reinforcing groove, and the reinforcing groove may be configured to limit the second elastic positioning member in an insertion direction of the second elastic positioning member.

Optionally, the lateral direction may comprise a second lateral direction parallel to a length direction of the mating face, and the second positioning member receiver may be arranged on a second side surface of the housing extending in the second lateral direction.

Optionally, the housing may have two second side surfaces, the two second side surfaces may be opposite in a first lateral direction perpendicular to the second lateral direction, and each of the two second side surfaces may be provided with the second positioning member receiver.

Optionally, the mounting portion may be mounted to the grooves in a direction toward the mating face, a limiting barb may be arranged in interspace between the pair of protrusions, the mounting portion may be provided with a barb slot engaged to the limiting barb, and the limiting barb may limit the mounting portion in a direction away from the mating face.

Optionally, the grooves may have first ends face to the mounting face and second ends face to the mating face, the grooves may have a first spacing at the first ends and a second spacing at the second ends, and the second spacing may be smaller than the first spacing.

Optionally, an opening of the connecting portion may be opposite to the mating face.

Optionally, the connecting portion may be located in interspace between the pair of protrusions.

Optionally, the grooves may be tightly close to the housing such that a space may be formed between the pair of protrusions and at a side of the grooves opposed to the housing, and the abutting portion may be accommodated in the space.

Optionally, an outer surface of the abutting portion may be flush with an outer surface of the pair of protrusions when the abutting portion may abut against the mounting portion.

Optionally, a limiting surface may be arranged on an inner sidewall of the frame, and the positioning member receiver may be cooperated with the limiting surface to limit the housing from separating with the frame through the second opening.

Optionally, the frame may comprise a first frame and a second frame, the first frame and the second frame may enclose a mounting cavity for accommodating the housing, the first opening may be arranged in the first frame, the second opening may be arranged in the second frame, an inner sidewall of the second frame may protrude inwards the mounting cavity relative to an inner sidewall of the first frame such that the limiting surface may be formed by an end surface of the second frame facing the first frame.

Optionally, the end surface of the second frame may be provided with a latch and the first frame may be provided with a hole engaged with the latch.

Optionally, the conductor tail may be flexible.

Some embodiments relate to a floating connector. The floating connector may comprise a frame including a lower frame with a lower opening and an upper frame with an upper opening, a housing having a mating face at the top and a mounting face at the bottom, an elastic positioner located between the housing and the frame in the lateral direction and a plurality of conductors held by the housing. The lower frame and the upper frame may be separable. The lower frame may have a lower mounting recess, the upper frame may have an upper mounting recess, and the lower mounting recess and the upper mounting recess may form a mounting cavity together. The housing may be movably arranged in the mounting cavity in a lateral direction. The mating face may be provided with an interface for engaging with an electronic assembly to be connected to the floating connector. The interface may be exposed by the first opening. The elastic positioner may be elastically deformable when the housing moves relative to the frame. Each of the plurality of conductors may have a mating end extending to the interface and a conductor tail extending to the mounting face and exposed by the second opening.

Optionally, a mouth of the lower mounting recess may have a smaller size than that of the upper mounting recess, such that the housing may be supported on an edge of the lower frame.

Optionally, a lower end of the elastic positioner may abut against the edge of the lower frame.

Optionally, a positioning member receiver may be arranged on the side surface of the housing, the elastic positioner may be mounted to the housing by the positioning member receiver, and the positioning member receiver may be configured to limit the elastic positioner from separating upwards from the positioning member receiver.

Optionally, the positioning member receiver may comprise a pair of protrusions spaced apart. The pair of protrusions may be respectively provided with slots opposite to each other. The elastic positioner may comprise a mounting portion, an abutting portion and a connecting portion. The mounting portion and the abutting portion may be connected at two ends of the connecting portion. Two sides of the mounting portion may be inserted into the grooves respectively, and the abutting portion faces the frame.

Optionally, a reinforcing groove may be arranged in interspace between the pair of protrusions, a reinforcing opening may be arranged in the mounting portion, an edge of the reinforcing opening gets stuck in the reinforcing groove, and the reinforcing groove may be configured to limit the elastic positioner in an insertion direction of the elastic positioner.

Optionally, the mounting portion may be mounted to the grooves in an upward direction, a limiting barb may be arranged in interspace between the pair of protrusions, the mounting portion may be provided with a barb slot engaged to the limiting barb, and the limiting barb may limit the mounting portion in a downward direction.

Optionally, an opening of the connecting portion may be downward.

Some embodiments relate to an electronic assembly. The electronic assembly may comprise a circuit board and any floating connector mentioned above. The frame may be mounted on the circuit board. Conductor tails of a plurality of conductors may be electrically connected to the circuit board, and the conductor tails may be configured to have a length that allows a housing to move in the frame.

Optionally, the housing may be movable in the lateral direction during the insertion of a mating component into the interface. The elastic positioner may elastically deform (for example, stretching or compressing) during movement of the housing in the lateral direction. After the mating component is removed, the elastic positioner may release elastic potential energy, so that the housing can return to its original position.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures is represented by a like numeral. For purposes of clarity, not every component may be labeled in every drawing. In the drawings.

Figure 1:
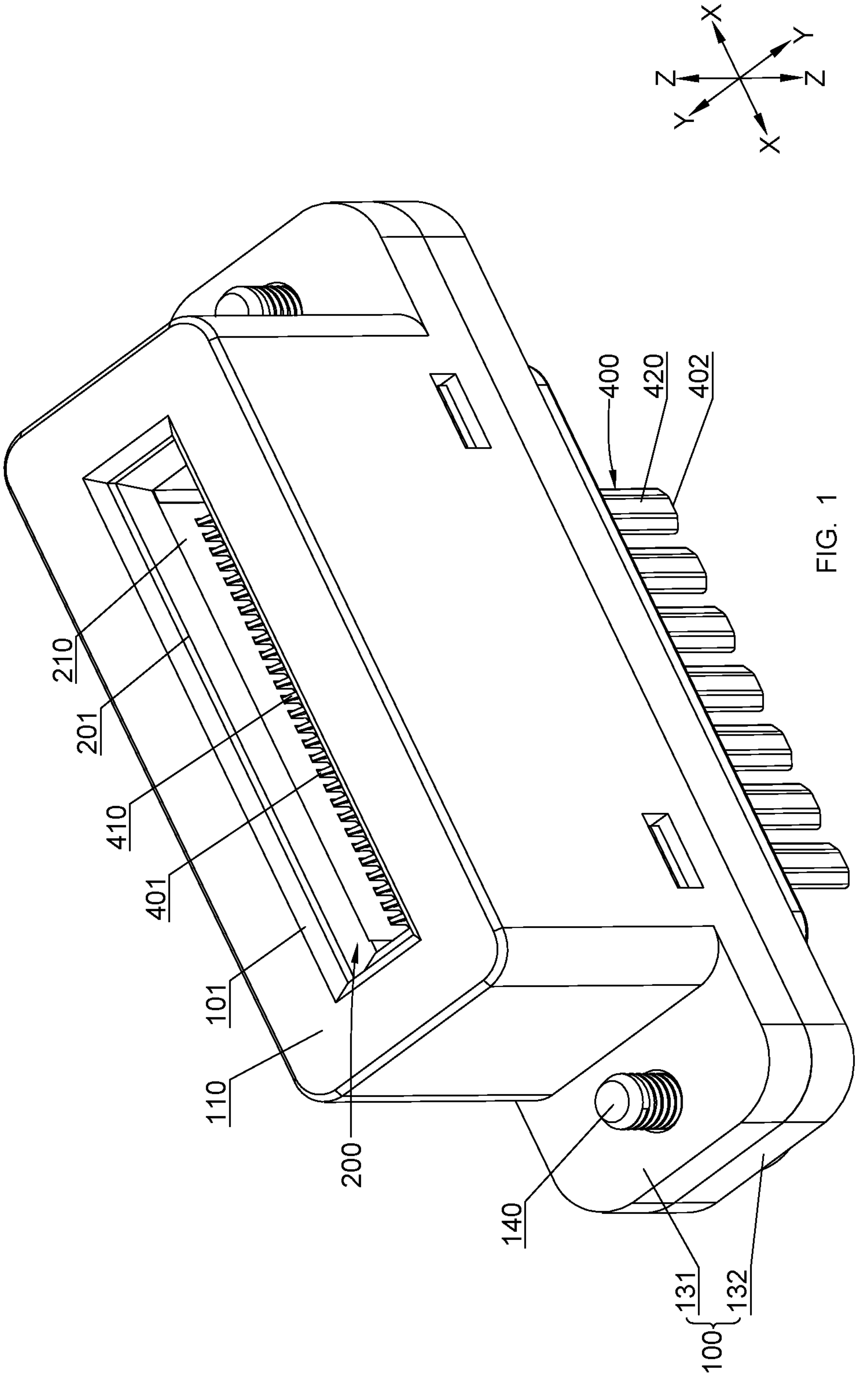
FIG. 1 is a front, side perspective view of a floating connector, according to some embodiments.
Figure 2:
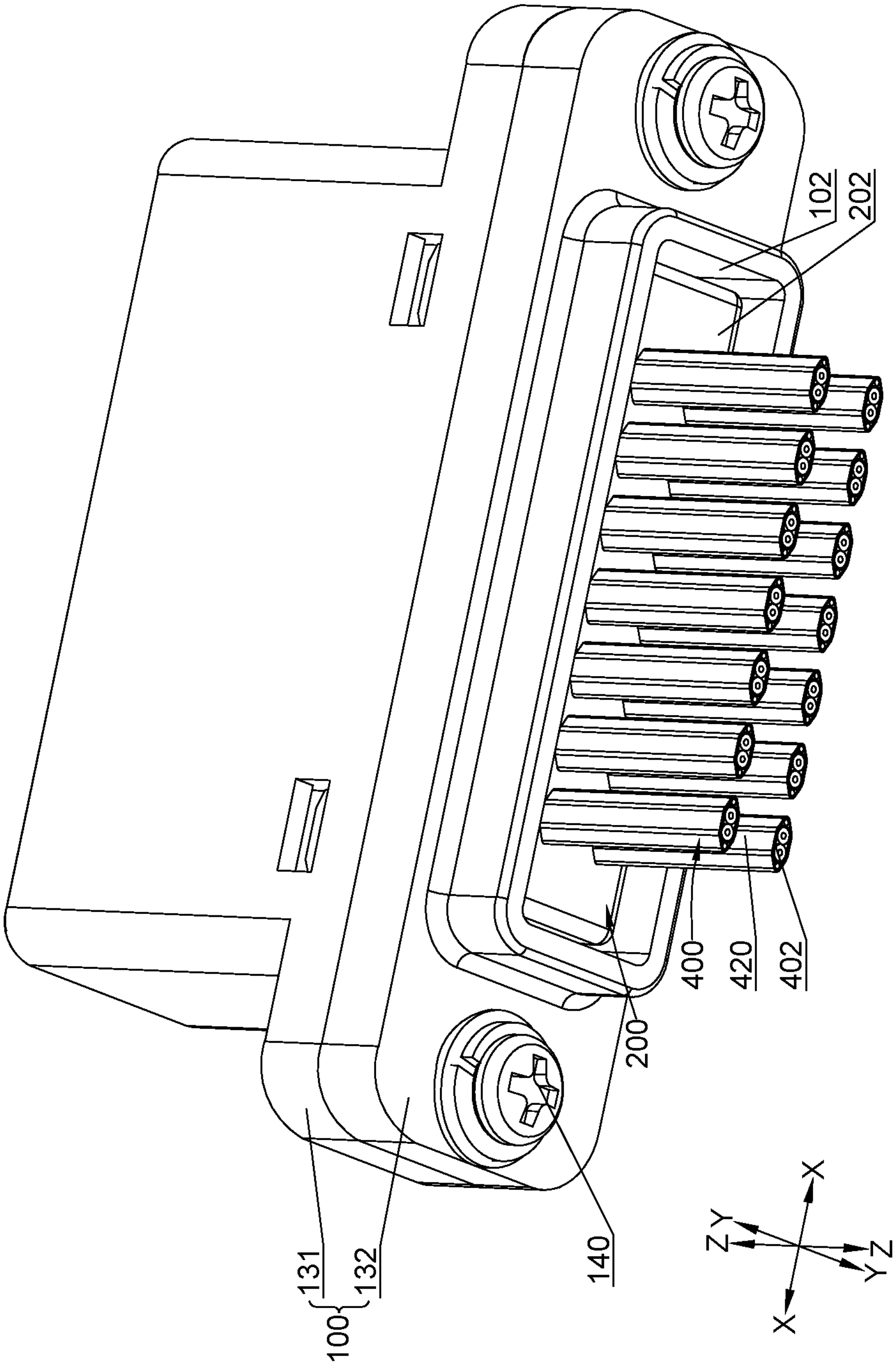
FIG. 2 is a rear, side perspective view of the floating connector of FIG. 1.

The above accompanying drawings include the following reference signs:

100—frame; 101—first opening; 102—second opening; 110—first surface; 120—limiting surface; 131—first frame; 132—second frame; 133—mounting cavity; 134—hole; 135—latch; 140—fastener; 200—housing; 201—mating face; 202—mounting face; 203—first side surface; 204—second side surface; 210—interface; 220—adapting portion; 230—first positioning member receiver; 231—first protrusion; 232—first groove; **232*a*—first end; 232*b*—second end; 240—second positioning member receiver; 241—second protrusion; 242—second groove; 242*a*—first end; 242*b*—second end; 243—reinforcing groove; 244—limiting barb; 300—elastic positioner; 310—first elastic positioning member; 311—first mounting portion; 311*a*—first fixing barb; 312—first abutting portion; 313—first connecting portion; 314—first barb slot; 320—second elastic positioning member; 321—second mounting portion; 321*a*—second fixing barb; 322—second abutting portion; 323—second connecting portion; 324—second barb slot; 325—reinforcing opening; 400—conductor; 401—mating end; 402—conductor tail; 410—conductive element; and 420**—cable component.

DETAILED DESCRIPTION

The inventors have recognized and realized connector designs that simplify and reduce the cost of electronic assemblies that use add-in cards or other components that mate to connectors mounted to a printed circuit board. Such connector designs may enable the connector mating interfaces to be positioned according to location of the respective mating components, which provides more compact, simpler electronic assemblies yet reduces manufacturing costs.

While it is efficient to improve the function and performance of an existing electronic assembly by adding components such as add-in cards on its mainboard, an add-in card may be mounted at a particular position on a circuit board and the connector to which the add-in card will mate is mounted at a separate location. The mounting location of the connector and the mounting location of the add-in card may be such that, when both components are mounted as intended, the add-in card mates to the connector. However, to accommodate for the possibility that the add-in card or connector are not mounted to the circuit board in the desired locations, in conventional designs the add-in card may be mounted through components that enable a floating function, such that the position of the mating portion of the add-in card can be adjusted to mate with the connector, even after the add-in card is mounted to the circuit board. Incorporating a floating function leads to a system architecture that is more complex and expensive.

The electrical connectors described herein may have floating functions. Such a configuration may enable the electronic assembly to be concise in structure, lower in size and cost. The floating connector may directly replace the existing electrical connector without changing other components of the electronic assembly.

In some embodiments, a floating connector may have a mating interface configured to move so as to align with a mating component, such as an add-in card. The connector may have a housing including the mating interface of the connector. Conductors held by the housing may have mating contact portions adjacent the mating interface. The connector may also include a frame configured to be fixed to a board to which the connector is mounted. The housing may be movable in the frame. The connector may have elastic positioning members disposed between the housing and the frame, such that the elastic positioning members enable the housing to move within the frame for properly aligning the mating interface with a mating component and bias the housing to return to an initial position when the mating component is removed.

In some embodiments, a floating connector may include a frame, a housing, and conductors held by the housing. The housing may be movably arranged in the frame such that even if the position of the frame connected to the circuit board deviates, the housing may self-adjust its position based on a mating component inserting into a slot of the housing. An elastic positioner may be disposed between the housing and the frame. The position of the housing may be adjusted according to the mating component because of the elasticity of the elastic positioner. The mating component may be movable, thereby ensuring that the electronic assembly is successfully mounted in position.

The floating connectors described herein may be assembled with simpler processes, which may improve consistency in mass-produced products. In some embodiments, the elastic positioner may be first mounted on the housing, then the housing may be mounted to a lower frame, and finally an upper frame may be fastened to the lower frame to enclose the housing. Further, after the elastic positioner is mounted on the housing, it may be used as a supporting structure for the housing on the lower frame, thereby enabling the housing to be supported by the lower frame. Optionally, the upper frame may be guided by the elastic positioner when mounted to the lower frame. In this way, the upper frame can be smoothly mounted to the lower frame.

Embodiments of the floating connectors are described below in detail in conjunction with the accompanying drawings.

For purpose of easy description, a vertical direction Z-Z, a first lateral direction Y-Y, and a second lateral direction X-X are defined. The vertical direction Z-Z, the first lateral direction Y-Y and the second lateral direction X-X may be perpendicular to one another. The vertical direction Z-Z generally refers to a height direction of the floating connector. The first lateral direction Y-Y generally refers to a width direction of the floating connector. The second lateral direction X-X generally refers to a length direction of the floating connector.

As shown in FIGS. 1 to 5, a floating connector may include a frame 100, a housing 200, an elastic positioner 300 and a plurality of conductors 400. Although the floating connectors illustrated in the figures are vertical connectors, it should be appreciated that floating connectors may be right-angle connectors, orthogonal connectors or the like.

The frame 100 may be insulating. The frame 100 may be made of an insulating material such as plastics. As illustrated, the frame 100 may include a plurality of parts joined together to facilitate installation of the housing 200 into the frame 100. The frame 100 is further configured for fixing the floating connector to the circuit board, and therefore the frame 100 is configured to have sufficient strength. The frame 100 may have a first opening 101 and a second opening 102. Two ends of the conductors 400 held by the housing 200 may be exposed by the first opening 101 and the second opening 102, respectively.

The housing 200 may be molded from an insulating material such as plastics. The housing 200 may be an integrated member. The housing 200 may have a mating face 201 and a mounting face 202. In an embodiment where the floating connector is the right-angle connector, the mating face 201 and the mounting face 202 are perpendicular to each other. In other types of floating connectors, such as a vertical connector, the mating face 201 and the mounting face 202 are parallel to each other. However, regardless of the types of the floating connectors, the mating faces 201 and the mounting faces 202 may function in similar ways in various connectors.

An interface 210 may be arranged on the mating face 201. The interface 210 may be configured to engage an electronic assembly to be connected to the floating connector. The electronic assembly may include, but is not limited to a graphics card, a solid state disk (SSD) or the like. The interface 210 may be exposed by the first opening 101. Exemplarily, the interface 210 may be accommodated in the first opening 101 or extend out of the first opening 101, so long as the electronic assembly can be connected to the interface 210. In an embodiment where the floating connector is a plug connector, the interface 210 may be a plug. In an embodiment where the floating connector is a receptacle connector, the interface 210 may be a slot. FIGS. 1 to 5 shows an example of the floating connector being a receptacle connector. However, regardless of the types of the floating connectors, the slots 210 may function in similar ways in various connectors, that is, the slots 210 are configured to engage electronic assemblies to be connected to respective floating connectors.

The housing 200 may be movably arranged in the frame 100 in a lateral direction. The frame 100 may be configured to limit the housing 200. The first lateral direction Y-Y and the second lateral direction X-X may determine a plane. The lateral direction may be any direction within the plane. The lateral direction may be parallel to the mating face 201. The first lateral direction Y-Y may be parallel to a width direction of the mating face 201. The second lateral direction X-X may be parallel to a length direction of the mating face 201.

The elastic positioner 300 may be disposed between the housing 200 and the frame 100, such that the elastic positioner 300 enable the housing 200 to move within the frame 100 for properly aligning the interface 210 with a mating component and bias the housing 200 to return to an initial position when the mating component is removed. The elastic positioner 300 may include a coil spring, a spring plate, or combination of them. Alternatively or additionally, the elastic positioner 300 may be made of an elastic material such as rubber. When the elastic positioner 300 includes a coil spring or a spring plate, the elastic positioner 300 may optionally be made of a metal material, which has sufficient elasticity and a longer service life. The elastic positioner 300 may be located between the housing 200 and the frame 100 in the lateral direction. The elastic positioner 300 may be elastically deformed when the housing 200 moves relative to the frame 100. The elastic positioner 300 may tolerate the shake of the housing 200 in the lateral direction. The elastic positioner 300 may be in a compressed state or in a stretched state between the housing 200 and the frame 100, or may be in a natural state when not subjected to an external force. Two ends of the elastic positioner 300 may be connected to and/or abut against the housing 200 and the frame 100 respectively. Optionally, when no external force is applied on the housing 200, the elastic positioner 300 may be spaced a distance from one or both of the housing 200 and the frame 100. The elastic positioner 300 can begin to position the housing 200 once the housing 200 moves in the frame 100. In practical applications, the position of the housing 200 in the frame 100 is determined mainly by the position deviation of the floating connector on the circuit board. When the electronic assembly is stably connected to the floating connector, the electronic assembly can be maintained in position by the surrounding electronic assemblies, and thus the position of the housing 200 is no longer changed in the frame 100. The elastic positioner 300 may assist in positioning the housing 200 when the floating connector in use. The housing 200 may also be positioned by the elastic positioner 300 in an unused floating connector. The inventors have further recognized and appreciated that stub resonance may be caused by a connector pre-installed in the factory but unused. Specifically, the unused connector mounted on the circuit board serves as stubs and affects the signal integrity. At a higher memory-bus speed, high contacts (for example, at a height of 6 mm) can generate stub resonance in the unused connector. The stub resonance can be suppressed to some extent through maintaining the position of the housing 200 in the frame by the elastic positioner 300.

The plurality of conductors 400 may be held by the housing 200. Adjacent conductors 400 may be spaced apart to ensure electrical insulation from each other. The conductors 400 may be made of a conductive material such as metal. The conductors 400 may be elongated one-piece members. Each conductor 400 may include a mating end 401 and a conductor tail 402 at two ends of the conductor 400 in an extension direction thereof. The mating end 401 may be configured for being electrically connected to the electronic assembly. The conductor tail 402 may be configured for being electrically connected to the circuit board. In this way, the electronic assembly is electrically connected to the circuit board through the floating connector, thereby creating interconnection between circuits on the electronic assembly and circuits on the circuit board. The mating ends 401 of the conductors 400 may extend to the mating face 201. The conductor tails 402 of the conductors 400 may extend to the mounting face 202. The conductor tails 402 may be exposed by the second opening 102. Exemplarily, the conductor tails 402 may be accommodated in the second opening 102 or extend out of the second opening 102, so long as the conductor tails 402 may be connected to the circuit board.

In practical applications, the housing 200 is movable in the lateral direction during the insertion of the electronic assembly into the interface 210. The electronic assembly can be mounted in place. The elastic positioner 300 may elastically deform (for example, stretching or compressing) during movement of the housing 200 in the lateral direction. After the electronic assembly is removed, the elastic positioner 300 may release elastic potential energy, so that the housing 200 returns to its original place in the lateral direction in preparation for accepting the electronic assembly again.

Exemplarily, the conductor tails 402 of the conductors 400 are flexible. In the embodiments shown in the figures, each conductor 400 may include a conductive element 410 and a cable component 420. One end of the conductive element 410 may be configured as a mating end 401. The other end of the conductive element 410 may be connected to the cable component 420. The other end of the cable component 420 may be configured as the conductor tail 402. In other embodiments not shown in the figures, the conductor tail 402 may also be of a thinner structure, or be made of a flexible material or the like to make the conductor tail 402 flexible. In this way, the conductor tail 402 can move with the housing 200 during the insertion of the electronic assembly. The conductor tail 402 does not become a limiting factor to the movement of the housing 200, and the housing 200 has enhanced degree of freedom.

Exemplarily, the housing 200 may be in structure similar to a housing of existing electrical connector with no floating function. However, there may be a need to suitably reduce the height of the interface 210 in the housing 200, and the reduced height may be compensated by the thickness of the frame 100. In this way, the interface 210 may be adapted to the existing electronic assembly. The conductors 400 can be similar to the conductors of the existing connector with no floating function. In this way, existing parts may be reused, and the cost is lower.

Exemplarily, the first opening 101 is configured to completely expose the interface 210 when the housing 200 is in a maximum moveable range relative to the frame 100. Accordingly, the connection of the electronic assembly to the interface 210 would not be affected by the movement of the housing 200 in the frame 100. Therefore, the electronic assembly has a relatively larger adjustment range in the lateral direction, and thus may be suitable for more applications.

Exemplarily, the frame 100 may include a first surface 110. The first opening 101 may be arranged on the first surface 110. The first surface 110 may be configured to restrict the housing 200 from separating with the frame 100 through the first opening 101. The size of the first surface 101 may be smaller than that of the housing 200, thereby restrict the housing 200 from separating with the frame 100 through the first opening 101. Specifically, in the first lateral direction Y-Y, the width of the first opening 101 may be less than that of the housing 200; and/or in the second lateral direction X-X, the length of the first opening 101 may be less than that of the housing 200. The housing 200 therefore would not be separated from the frame 100 such as sliding out of the frame 100 via the first opening 101 during movement.

Figure 3:
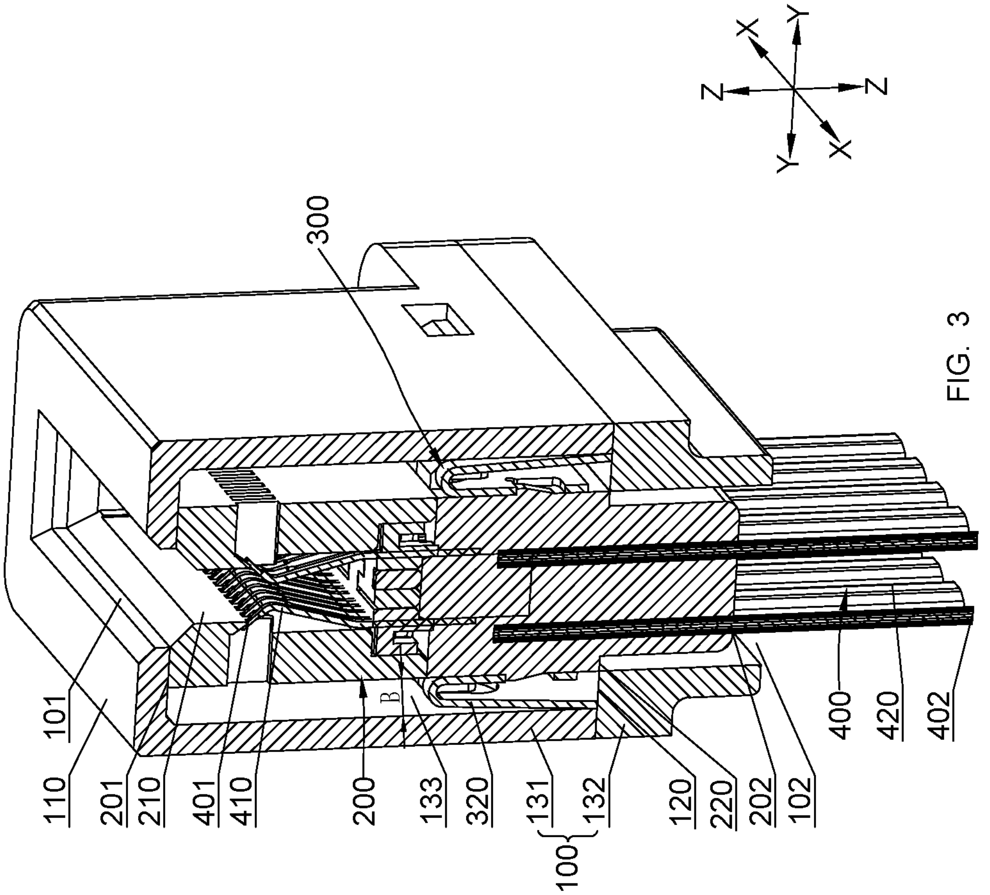
FIG. 3 is a cross-sectional perspective view of the floating connector of FIG. 1, taken by a plane perpendicular to a second lateral direction.
Figure 4:
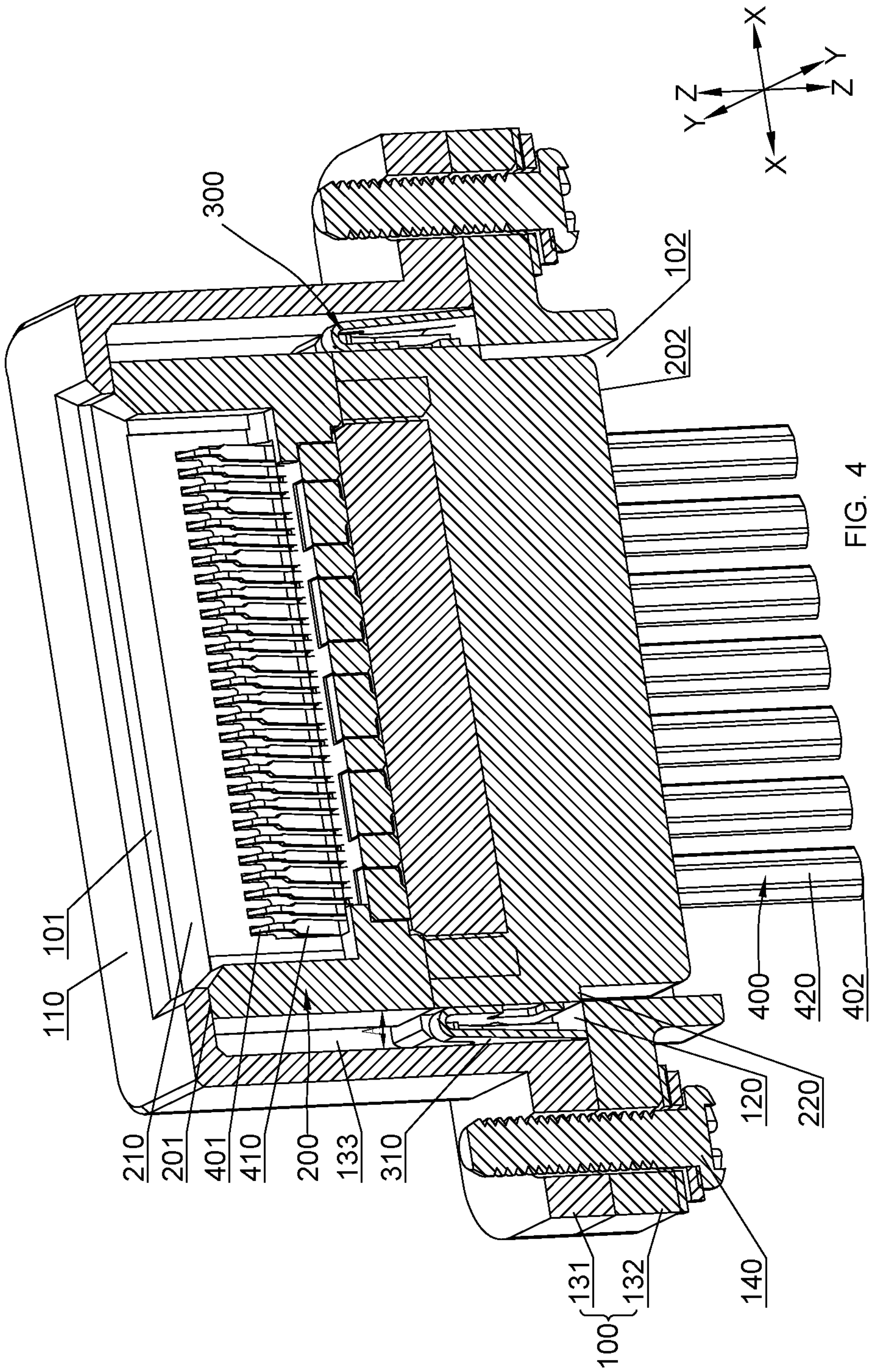
FIG. 4 is a cross-sectional perspective view of the floating connector of FIG. 1, taken by a plane perpendicular to a first lateral direction.
Figure 5:
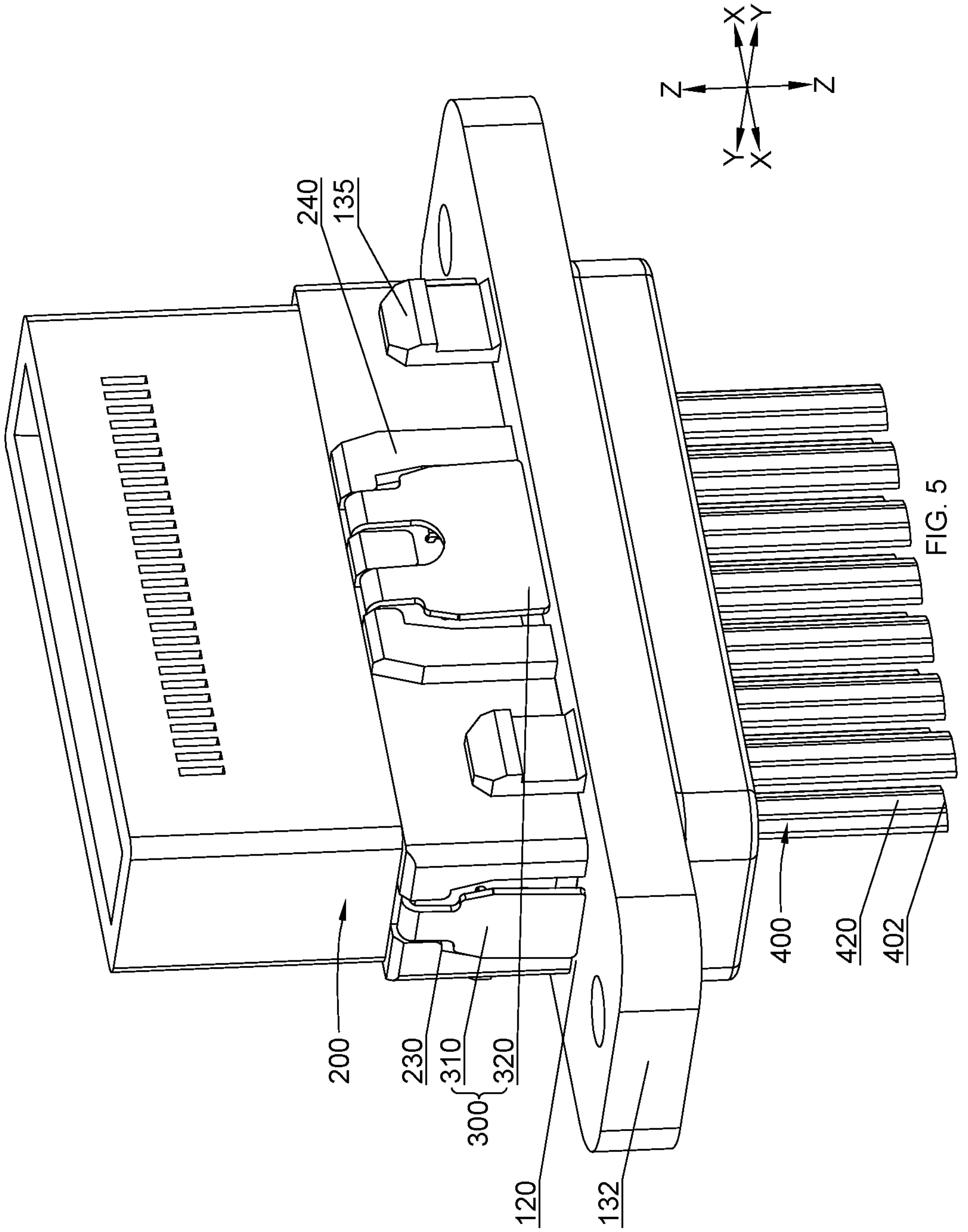
FIG. 5 is a perspective view of an internal structure of the floating connector of FIG. 1, where a first frame and fasteners hidden.

Exemplarily, an inner sidewall of the frame 100 may be provided with a limiting surface 120, as shown in FIGS. 3 and 4. The housing 200 may be provided with an adapting portion 220. The adapting portion 220 may be cooperated with the limiting surface 120 to restrict the housing 200 from separating with the frame 100 through the second opening 102. Accordingly, the housing 200 does not separate from the frame 100 through the second opening 102 during movement. The first surface 110 and the limiting surface 120 may limit the housing 200 in directions perpendicular to the lateral direction and opposite to each other respectively, so that the housing 200 can only move in the lateral direction. The lateral direction may be parallel to the mating face 201.

Exemplarily, the elastic positioner 300 may abut against the limiting surface 120, which can limit the elastic positioner 300 to its expected position. If the elastic positioner 300 is mounted on the housing 200, the elastic positioner 300 may also play a limiting role for the housing 200. The adapting portion 220 may be omitted or get smaller, and the floating connector becomes more compact in structure. In addition, during the assembling of the floating connector, the elastic positioner 300 may be placed on the limiting surface 120, so that the assembling may be simplified and have improved efficiency. The assembling of the floating connector is described in detail below.

Figure 9:
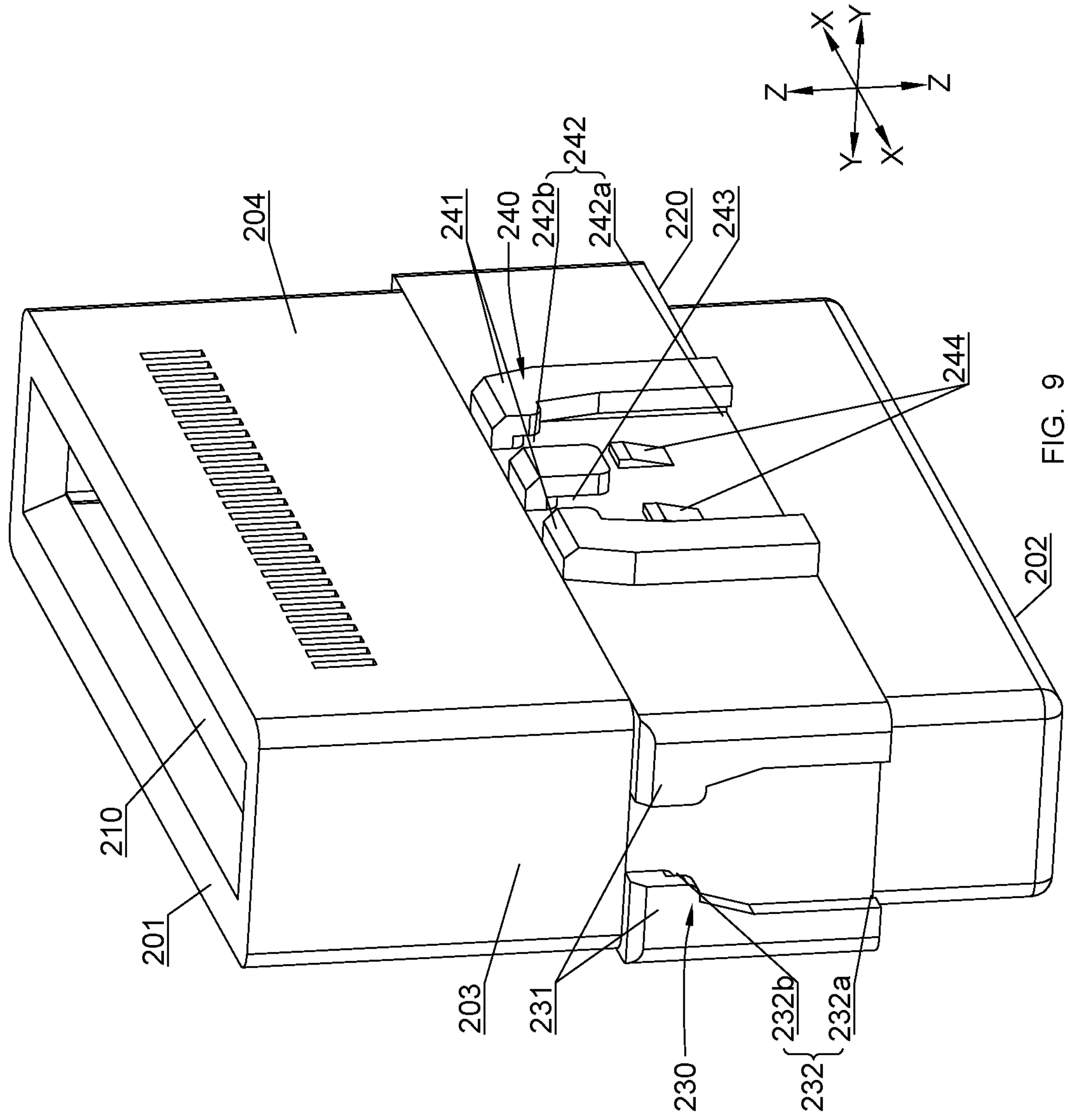
FIG. 9 is a perspective view of a housing of the internal structure of FIG. 5.

Exemplarily, a positioning member receiver may be arranged on a side surface of the housing 200. The elastic positioner 300 may be mounted on the housing 200 through the positioning member receiver. The side surface of the housing 200 may be connected between a mating face 201 and a mounting face 202. Specifically, the side surface of the housing 200 may include a pair of first side surfaces 203 and a pair of second side surfaces 204, as shown in FIG. 9. The pair of first side surfaces 203 may be oppositely arranged in a second lateral direction X-X. Each first side surface 203 may extend in a first lateral direction Y-Y. The pair of second side surfaces 204 may be oppositely arranged in the first lateral direction Y-Y. Each of second side surfaces 204 may extend in the second lateral direction X-X. Therefore, the side surface of the housing 200 may be shaped like a rectangular frame. Each of the first side surfaces 203 and the second side surfaces 204 may be provided with the positioning member receiver, and therefore the housing 200 may be movable in both the first lateral direction Y-Y and the second lateral direction X-X. Optionally, only a part of the first side surfaces 203 and the second side surfaces 204 may be connected with the elastic positioner 300. For example, the positioning member receiver may be arranged on one of the first side surfaces 203 and/or one of the second side surfaces 204 to connect the elastic positioner 300. Alternatively or additionally, the positioning member receiver may be arranged on the pair of first side surfaces 203 and/or the pair of second side surfaces 204.

Figure 6:
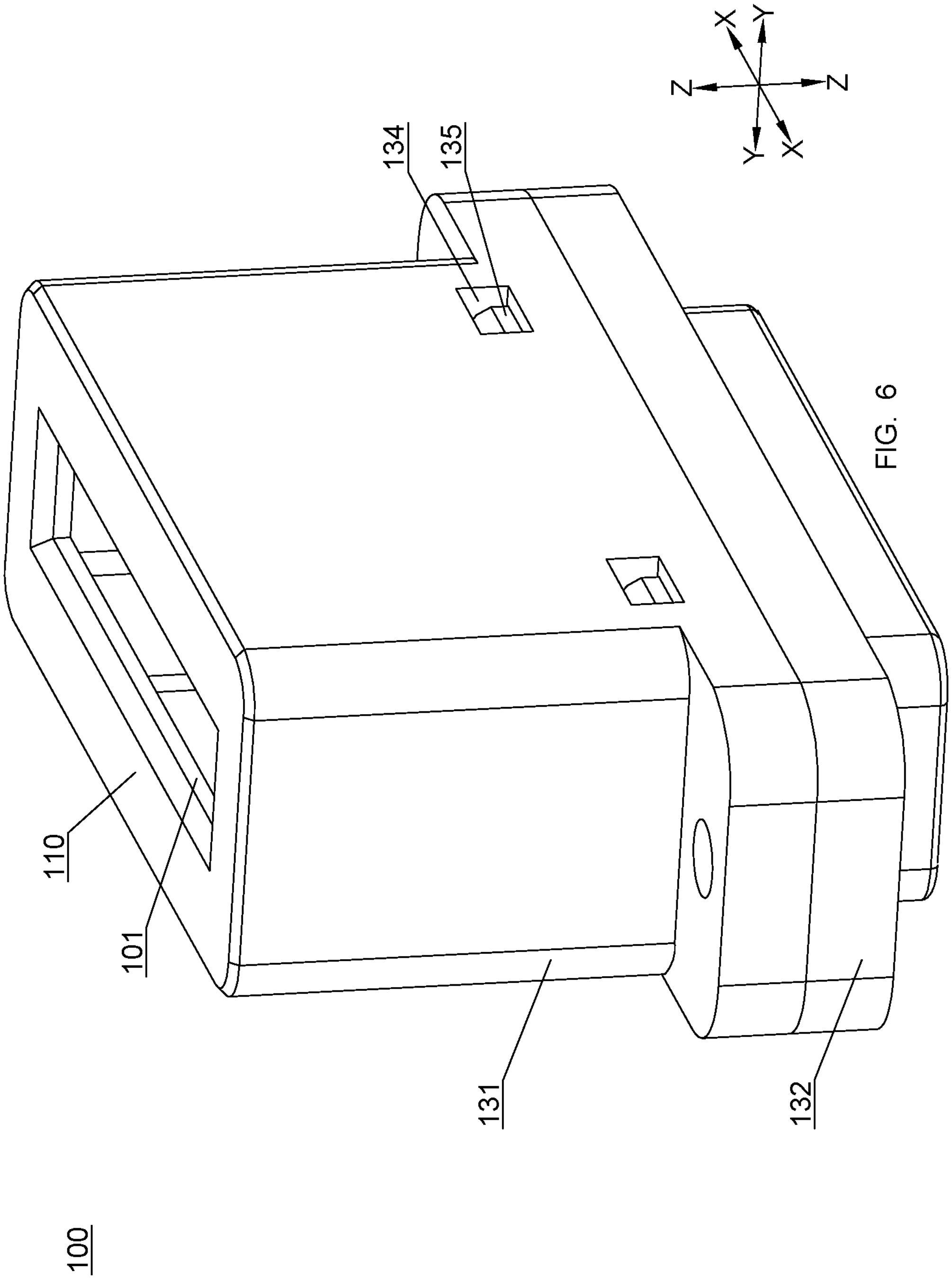
FIG. 6 is a perspective view of the frame of the floating connector of FIG. 1.
Figure 7:
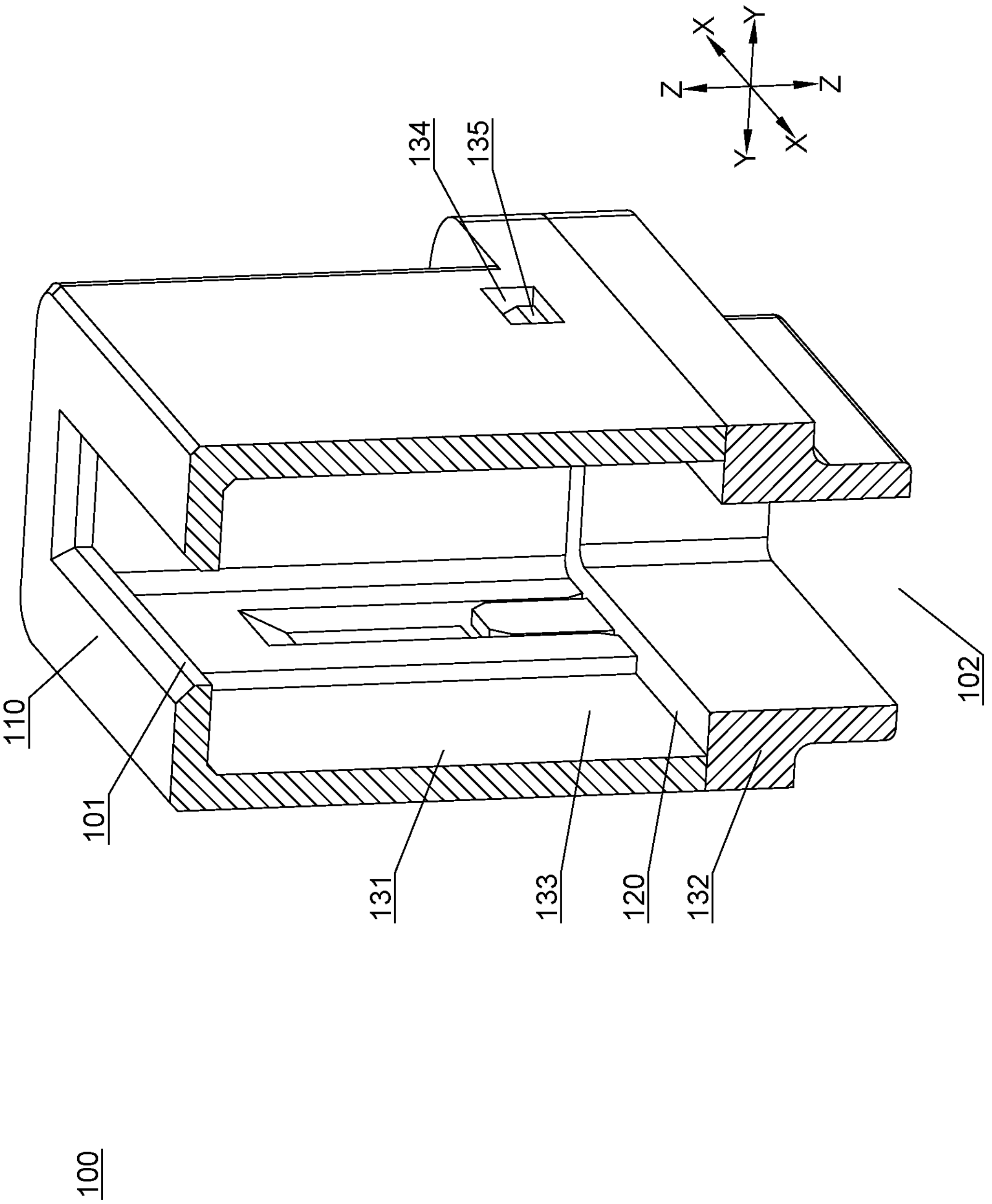
FIG. 7 is a cross-sectional perspective view of the frame shown in FIG. 6, taken by a plane perpendicular to the second lateral direction.
Figure 8:
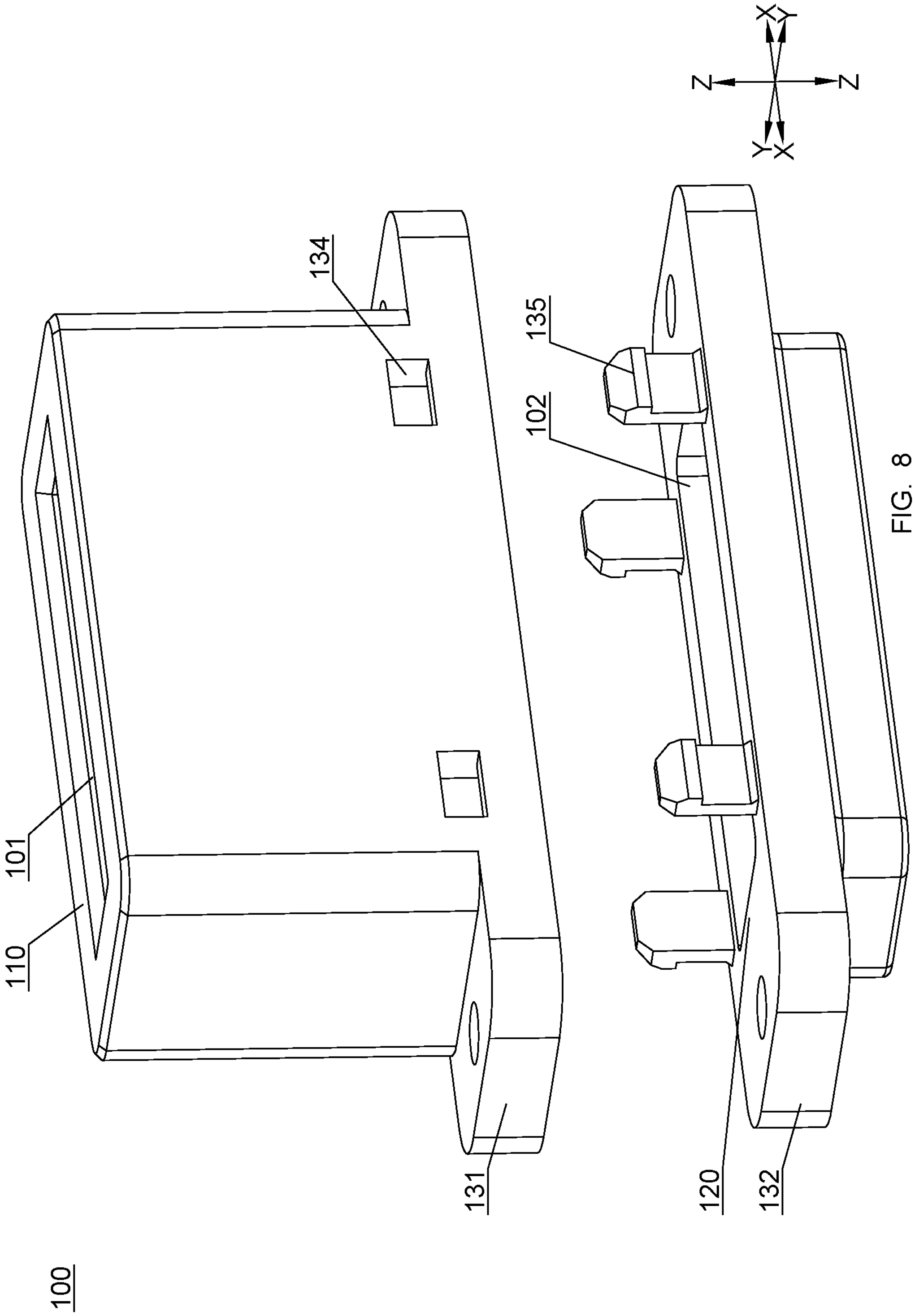
FIG. 8 is an exploded view of the frame of FIG. 6.

Exemplarily, as shown FIGS. 6 to 8, a limiting surface 120 may be arranged on an inner sidewall of the frame 100. The positioning member receiver may be cooperated with the limiting surface 120 to restrict the housing 200 from separating with the frame 100 through the second opening 102.

Exemplarily, the frame 100 may include a first frame 131 (for example, an upper frame in the figures) and a second frame 132 (for example, a lower frame in the figures). The first frame 131 and the second frame 132 may enclose a mounting cavity 133, as shown in FIGS. 3 and 4. The housing 200 may be accommodated in the mounting cavity 133. Specifically, a lower opening (for example, a second opening 102) may be arranged on the lower frame. An upper opening (for example, a first opening 101) may be arranged on the upper frame. The lower frame may have a lower mounting recess with an upwards mouth. The upper frame may have an upper mounting recess with a downwards mouth face to the mouth of the lower frame. The lower mounting recess and the upper mounting recess can form a mounting cavity together.

The first opening 101 may be arranged on the first frame 131. The second opening 102 may be arranged on the second frame 132. An inner sidewall of the second frame 132 may protrude inwards the mounting cavity 133 relative to the inner sidewall of the first housing 131. As illustrated, the limiting surface 120 is formed by an end surface of the second frame 132 facing the first frame 131. In this way, the frame 100 has simpler structure and lower manufacturing cost. It should be appreciated that the limiting surface 120 may be arranged in the middle of the second frame 132 or on the first frame 131. Although the first frame 131 and the second frame 132 are shown as two parts divided in the vertical direction Z-Z, it should be appreciated that the first frame 131 and the second frame 132 may be two parts divided in the first lateral direction Y-Y or in the second lateral direction X-X.

Exemplarily, a latch 135 may be arranged on the end surface of the second frame 132, as shown in FIGS. 5 to 8. A hole 134 engaged with the latch 135 may be arranged on the first frame 131. In such arrangement, it is more convenient and rapid for connecting the first frame 131 to the second frame 132. Exemplarily, there may be a plurality of latches 135. The latches 135 may engage holes 134 in one-to-one correspondence. Exemplarily, the first frame 131 and the second frame 132 may also be connected through fasteners 140. The fasteners 140 include, but is not limited to, screws, rivets, and the like. It can enhance the connection strength of the first frame 131 and the second frame 132.

Exemplarily, as shown in FIGS. 9 to 14, the positioning member receiver may include a first positioning member receiver 230. The first positioning member receiver 230 may include a pair of spaced-apart first protrusions 231. A first groove 232 may be arranged on each of the pair of first protrusions 231. The first grooves 232 on the two first protrusions 231 face each other. That is, mouths of the two first grooves 232 are opposite to each other. The elastic positioner 300 may include a first elastic positioning member 310. The first elastic positioning member 310 may be a sheet metal piece. In this way, the first elastic positioning member 310 can have relatively higher strength, and be manufactured by a simpler process and more cost-saving. The first elastic positioning member 310 may include a first mounting portion 311, a first abutting portion 312, and a first connecting portion 313. The first mounting portion 311 and the first abutting portion 312 may be connected at two ends of the first connecting portion 313. The first elastic positioning member 310 may have a relatively good elasticity. Exemplarily, two sides of the first mounting portion 311 may be inserted into the first grooves 232 on the pair of first protrusions 231 respectively. The first abutting portion 312 may face the frame 100. In a natural state, there may be a relatively small spacing between the first abutting portion 312 and the frame 100. The first abutting portion 312 abuts against the frame 100 after the housing 200 is moved. Alternatively or additionally, the first abutting portion 312 may always abut against the housing 200. In such arrangement, the first elastic positioning member 310 has a simpler structure and lower manufacturing cost. Also, the first elastic positioning member 310 is secured firmly and has a relatively higher stability. The first connecting portion 313 may be accommodated in a part of the interspace between the pair of first protrusions 231 closer to the mating face 201, such that the floating connector is more compact. Additionally, the spaced-apart first protrusions 231 may further be beneficial for heat dissipation of the conductors 400 in the housing 200.

Figure 12:
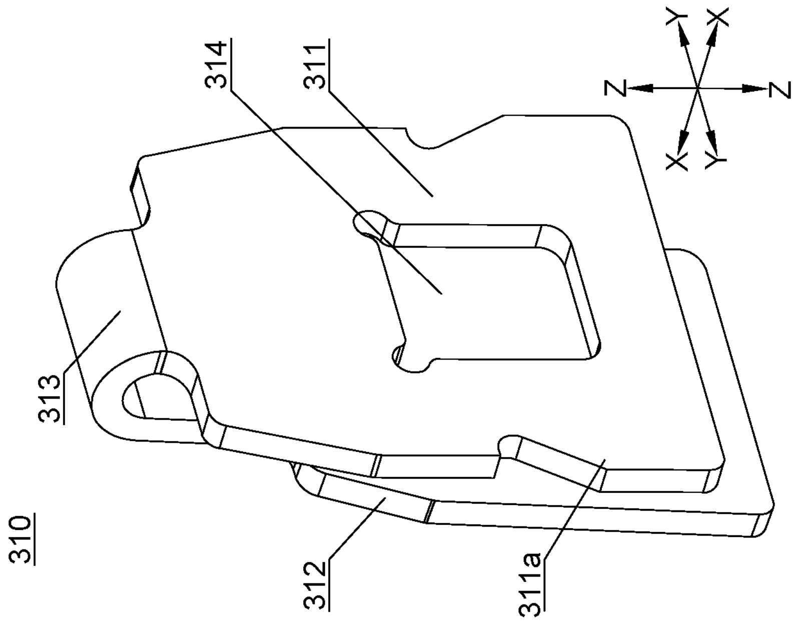
FIG. 12 is another perspective view of the first elastic positioning member of FIG. 11.
Figure 11:
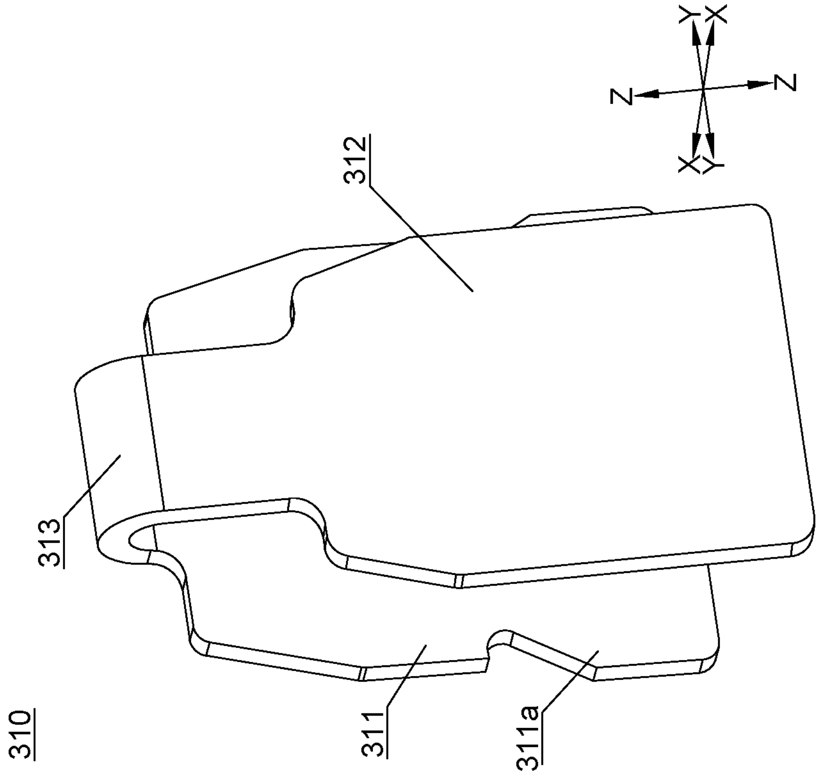
FIG. 11 is a perspective view of a first elastic positioning member of the internal structure of FIG. 5.

Exemplarily, the first mounting portion 311 may be secured by the first grooves 232 on the pair of first protrusions 231 in an interference fit manner. Referring to FIGS. 11 and 12, the first mounting portion 311 may be provided with first barbs 311*a*, so that the first mounting portion 311 is firmly held by the first grooves 232 on the first protrusions 231.

Exemplarily, the first positioning member receiver 230 may be arranged on the first side surface 203 of the housing 200. A pair of first protrusions 231 may be spaced apart in the first lateral direction Y-Y, referring to FIG. 9. Depending on the size of the first side surface 203, the pair of first protrusions 231 may be close to edges of the first side surface 203 respectively. The first elastic positioning member 310 may be inserted into the first grooves 232 in the vertical direction Z-Z. Referring to FIG. 4, a first gap A is left between the frame 100 and the housing 200 in the second lateral direction X-X. The first elastic positioning member 310 may be accommodated in the first gap A. The first elastic positioning member 310 may be elastically deformed in the first gap A. The housing 200 may be movable in the frame 100 in the second lateral direction.

Exemplarily, only one first side surface 203 may be provided with the first elastic positioning member 310 Each of the pair of first side surfaces 203 may be provided with the first elastic positioning member 310. The first elastic positioning members 310 may be located on opposite sides of the housing 200 in the second lateral direction X-X respectively. Accordingly, the housing 200 may have a greater movable distance in the second lateral direction X-X.

Exemplarily, the positioning member receiver may include a second positioning member receiver 240. The second positioning member receiver 240 may include a pair of spaced-apart second protrusions 241. A second groove 242 may be arranged on each of the pair of second protrusions 241. The second grooves 242 on the two first protrusions 241 face each other. That is, mouths of the two second grooves 242 are opposite to each other. The elastic positioner 300 may include a second elastic positioning member 320. The second elastic positioning member 320 may be a sheet metal piece. In this way, the second elastic positioning member 320 can have relatively higher strength, and be manufactured by a simpler process and cost-saving. The second elastic positioning member 320 may include a second mounting portion 321, a second abutting portion 322, and a second Connecting portion 323. The second mounting portion 321 and the second abutting portion 322 may be connected at two ends of the second connecting portion 323. Two sides of the second mounting portion 321 may be respectively inserted into the second grooves 242 on the pair of second protrusions 241. The second abutting portion 322 may face the frame 100. In a natural state, there may be a relatively small spacing between the second abutting portion 322 and the frame 100. The first abutting portion 312 abuts against the frame 100 after the housing 200 is moved. Alternatively or additionally, the second abutting portion 322 may always abut against the housing 200. In such arrangement, the second elastic positioning member 320 has a simpler structure and lower manufacturing cost. Also, the second elastic positioning member 320 may be fixed firmly and has a relatively higher stability. The second connecting portion 323 may be accommodated in a part of the interspace between the pair of second protrusions 241 close to the mating face 201, such that the floating connector is more compact. Additionally, the spaced-apart second protrusions 241 may further be beneficial to heat dissipation of the conductors 400 in the housing 200.

Figure 14:
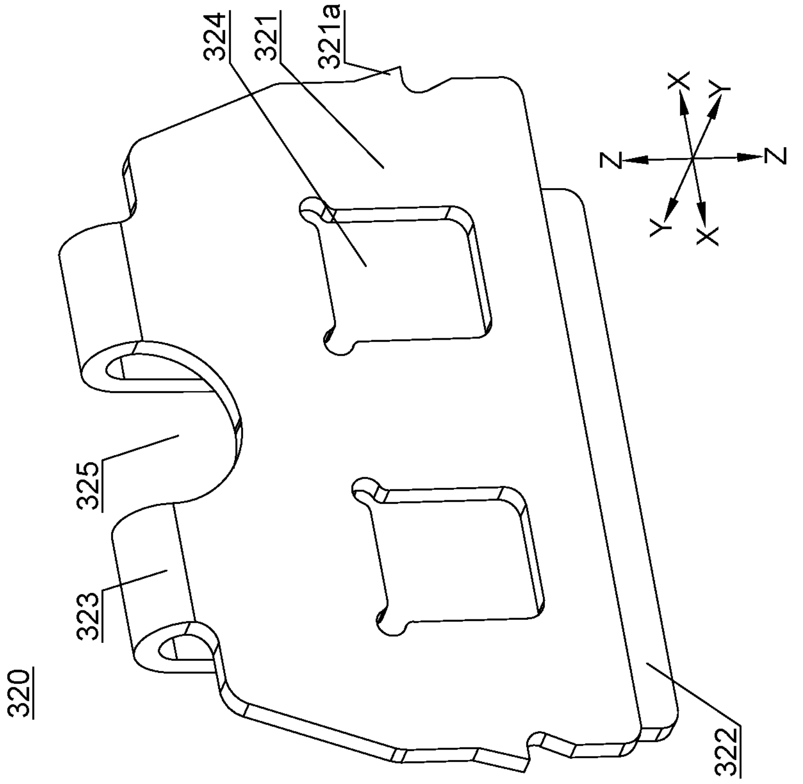
FIG. 14 is another perspective view of the second elastic positioning member of FIG. 13.
Figure 13:
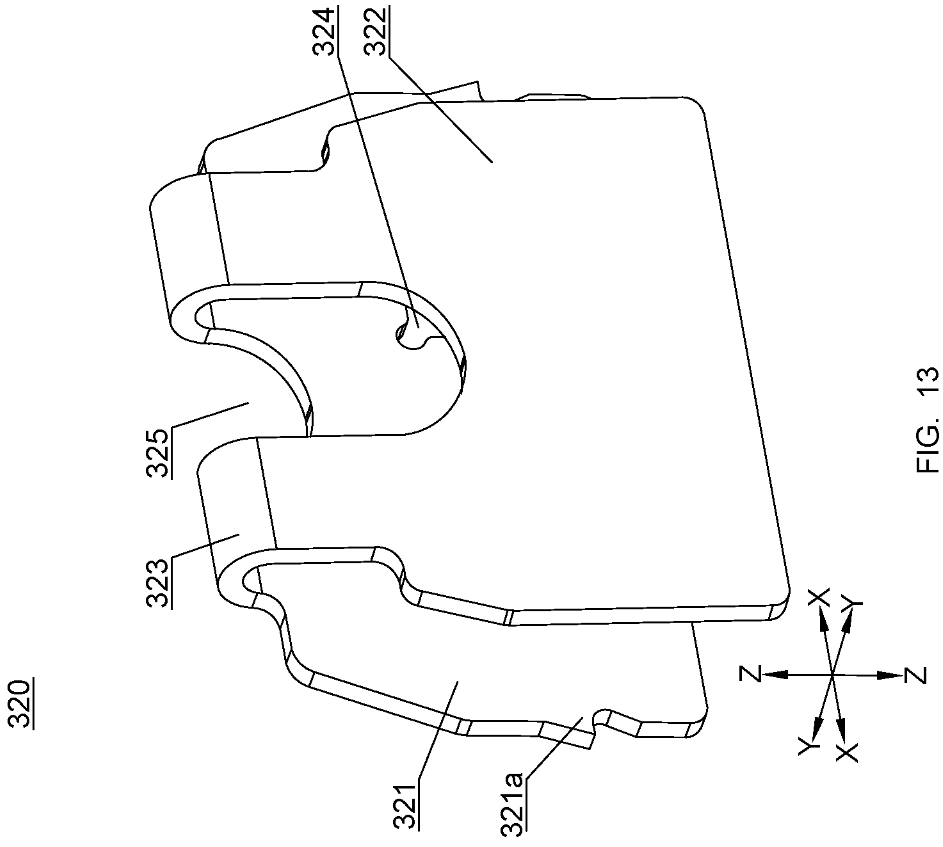
FIG. 13 is a perspective view of a second elastic positioning member of the internal structure of FIG. 5.

Exemplarily, the second mounting portion 321 may be secured by the second grooves 242 on the pair of second protrusions 241 in an interference fit manner. Referring to FIGS. 13 and 14, the second mounting portion 321 may be provided with second fixing barbs 321*a*, so that the first mounting portion 321 is firmly held by the second grooves 242 on the second protrusions 241.

Figure 10:
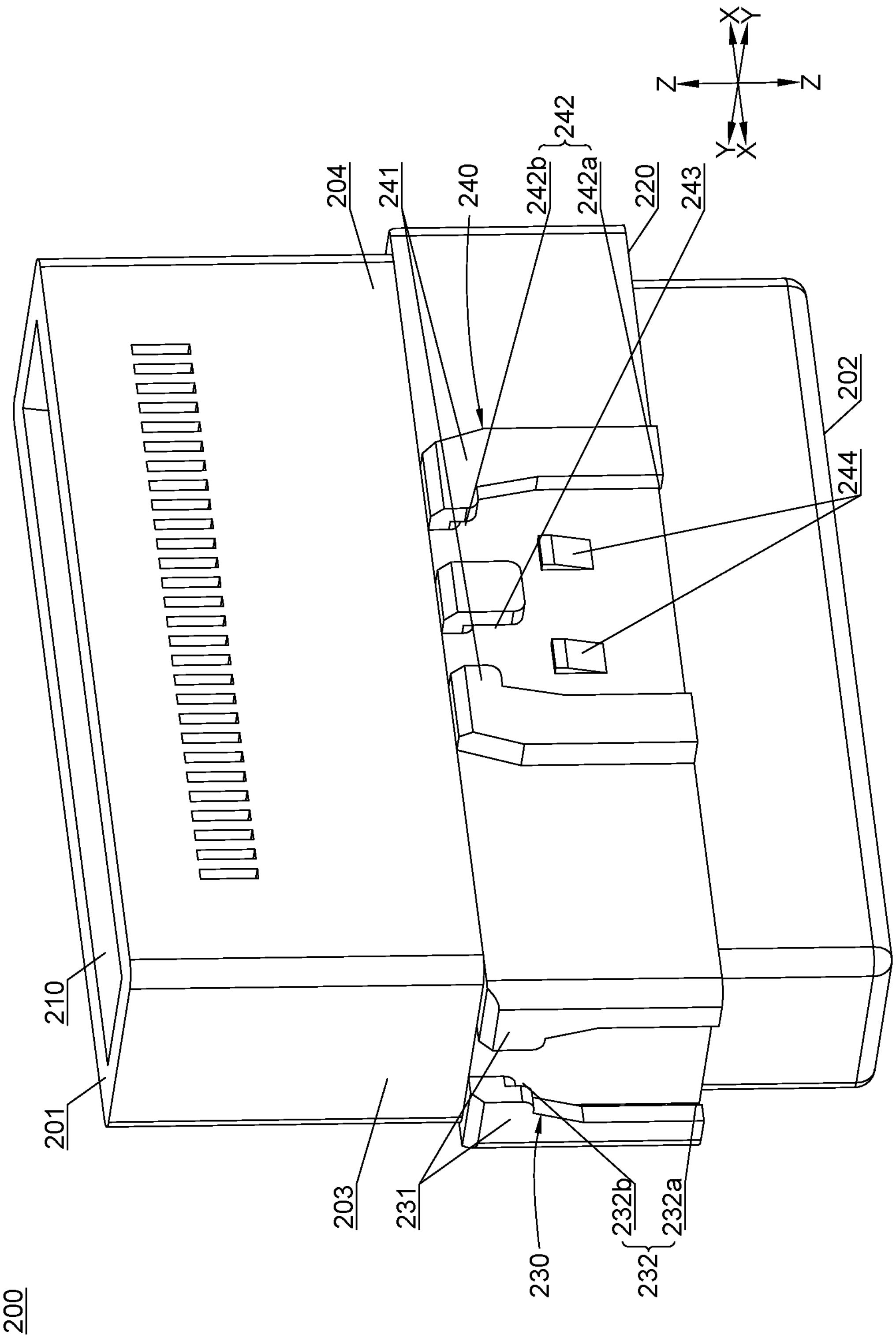
FIG. 10 is another perspective view of the housing of FIG. 9.

Exemplarily, a reinforcing groove 243 may be arranged in the interspace between the pair of second protrusions 241, as shown in FIGS. 9 and 10. A reinforcing opening 325 may be arranged in the second mounting portion 321, as shown in FIGS. 13 and 14. To increase the elasticity of the second connecting portion 323, the reinforcing opening 325 may run through the second connecting portion 323 to the second abutting portion 322. In this way, the weight of the second elastic positioning member 320 may also be reduced, thereby lowering the manufacturing cost. An edge of the reinforcing opening 325 gets stuck in the reinforcing groove 243. The reinforcing groove 243 is configured to limit the second elastic positioning member 320 in the insertion direction of the second elastic positioning member receiver 240. In the embodiments shown in the figures, the second elastic positioning member 320 may be inserted into the second grooves 242 in a direction toward the mating face 201. A bending portion may be bent opposite to the mating face 201 to form the reinforcing groove 243, which enables the upper portion of the second elastic positioning member 320 to be secured. Where the reinforcing groove 243 is provided, the interspace between the pair of second protrusions 241 may be greater to fit the larger second elastic positioning member 320. In this way, a more stable elastic positioning can be provided between the housing 200 and the frame 100. Also, the second elastic positioning member 320 can be fixed firmly and has a relatively higher stability.

Exemplarily, the second positioning member receiver 240 may be arranged on the second side surface 204 of the housing 200. A pair of second protrusions 241 may be spaced apart in the second lateral direction X-X, referring to FIG. 9. The second side surface 204 has a sufficient size, so that the pair of second protrusions 241 may be arranged in the middle of the second side surface 204. The reinforcing groove 243 may be arranged between the pair of second protrusions 241 in the second lateral direction X-X. The second elastic positioning member 320 may be inserted into the second grooves 242 in the vertical direction Z-Z. Referring to FIG. 3, a second gap B is left between the frame 100 and the housing 200 in the first lateral direction Y-Y. The second elastic positioning member 320 may be accommodated in the second gap B. The second elastic positioning member 320 may be elastically deformed in the second gap B. The housing 200 may be movably arranged in the frame 100 in the first lateral direction Y-Y.

Due to that an add-in card, such as a graphics card and a solid state disk, is usually of an elongated structure, the length of the housing 200 in the second lateral direction X-X is usually greater than the width thereof in the first lateral direction Y-Y. Exemplarily, the second positioning member receiver 240 may be larger than the first positioning member receiver 230. Therefore, the distance between the pair of second protrusions 241 may be greater than that between the pair of first protrusions 231. In this way, there may be a sufficient space to arrange the reinforcing groove 243 and the reinforcing opening 325. Optionally, there may be provided with one or more reinforcing grooves 243. When a plurality of reinforcing grooves 243 are arranged, the plurality of reinforcing grooves 243 may be spaced apart in the second lateral direction X-X. The reinforcing grooves 243 may be secured with multiple reinforcing openings 325 in one-to-one correspondence, or may be secured with single reinforcing opening 325.

Exemplarily, only one second side surface 204 may be provided with the second elastic positioning member 320. Ideally, each of the pair of second side surfaces 204 may be provided with the second elastic positioning member 320. The second elastic positioning member 320 may be located on opposite sides of the housing 200 in the first lateral direction Y-Y respectively. Accordingly, the housing 200 may have a greater movable distance in the first lateral direction Y-Y.

Exemplarily, the second mounting portion 321 may be secured by the second grooves 242 in a direction toward the mating face 201. Limiting barbs 244 may also be arranged in the interspace between the pair of second protrusions 241, as shown in FIGS. 9 and 10. Second barb slots 324 may be arranged in the second mounting portion 321, as shown in FIG. 14. The second barb slots 324 may be engaged to the limiting barbs 244. The limiting barbs 244 may limit the position of the second mounting portion 321 in a direction away from the mating face 201. When the second elastic positioning member 320 is mounted, an external force may be applied to the second elastic positioning member 320 in the mounting direction thereof, so that the second elastic positioning member 320 passes over the limiting barbs 244, thereby getting the limiting barbs 244 stuck to the second barb slots 324. Since the second elastic positioning member 320 is fixed by the reinforcing groove 243 and the second grooves 242 in a direction and the limiting barbs 244 in an opposite direction, the second elastic positioning member 320 can be firmly mounted on the housing 200.

Exemplarily, a first mounting portion 311 may also be mounted to the first grooves 232 in the direction toward the mating face 201. A limiting barb may also be arranged in the interspace between the pair of first protrusions 231. A first barb slot 314 may be arranged in the first mounting portion 311. The first barb slot 314 may be engaged to the limiting barb. The limiting barb may limit the position of the first mounting portion 311 in a direction away from the mounting face 202. In this way, the limiting barb and the first grooves 232 can limit the first elastic positioning member 310 in the opposite directions, so that the first elastic positioning member 310 is mounted on the housing 200. The limiting barb and the first barb slot 314 may have similar structures corresponding to the above-mentioned limiting barbs 244 and second barb slots 324, and therefore details are not described herein. However, due to the smaller interspace between the pair of first protrusions 231, a reinforcing groove like the reinforcing groove 243 may be omitted.

Exemplarily, each first groove 232 may have a first end 232*a* and a second end 232*b*, as shown in FIGS. 9 and 10. The first end 232*a* may face to the mounting face 202. The second end 232*b* may face to the mating face 201. The first grooves 232 on the pair of first protrusions 231 may have a first spacing at the first ends 232*a* and a second spacing at the second ends 232*b*. The second spacing may be less than the first spacing. The pair of first protrusions 231 may be shaped like columns of an arch. Therefore, the first mounting portion 311 of the first elastic positioning member 310 may be inserted into the first grooves 232 from the side close to the mounting face 202, and the first elastic positioning member 310 may be prevented from separating with the first grooves 232 upwardly. As previously described, the first elastic positioning member 310 may abut against the limiting surface 120, as shown in FIG. 4. After assembling, the limiting surface 120 may serve to prevent the first elastic positioning member 310 from separating with the first grooves 232 from the side close to the mounting face 202.

Similarly, each second groove 242 may have a first end 242*a* and a second end 242*b*, as shown in FIGS. 9 and 10. The first end 242*a* may face to the mounting face 202. The second end 242*b* may face to the mating face 201. The second grooves 242 on the pair of second protrusions 241 may have a first spacing at the first ends 242*a* and a second spacing at the second ends 242*b*. The second spacing may be less than the first spacing. The pair of second protrusions 241 may be shaped like columns of an arch. Therefore, the second mounting portion 321 of the second elastic positioning member 320 may be inserted into the second grooves 242 from the side close to the mounting face 202, and the second elastic positioning member 320 may be prevented from separating with the second grooves 242 upwardly. As previously described, the second elastic positioning member 320 may abut against the limiting surface 120, as shown in FIG. 3. After assembling, the limiting surface 120 may serve to prevent the second elastic positioning member 320 from separating with the second grooves 242 from the side close to the mounting face 202.

In such arrangement, the first elastic positioning member 310 and the second elastic positioning member 320 may be respectively inserted into the first grooves 232 and the second grooves 242 in the direction from the mounting face 202 to the mating face 201. The second end 232*b* and the second end 242*b* may respectively limit the first elastic positioning member 310 and the second elastic positioning member 320 in places.

Exemplarily, the opening of the first connecting portion 313 may be opposite to the mating face 201, which allows the first elastic positioning member 310 to be inserted into the first grooves 232 from the side close to the mounting face 202. Also, the gap between the first mounting portion 311 and the first abutting portion 312 is tapered towards the first connecting portion 313, with reference to FIG. 4 and FIGS. 11 and 12. It may lead, in the direction away from the mating face 201, to an increased size of the first elastic positioning member 310 in the second lateral direction X-X. In assembling, the housing 200 mounted with the first elastic positioning member 310 may be first seated on the second frame 132, and the limiting surface 120 may support the adapting portion 220 and the first elastic positioning member 310 meanwhile. Then, the first frame 131 is mounted, during which the outer side of the first abutting portion 312 may guide for the first frame 131, so that the first frame 131 may be mounted in place smoothly. Even if the first elastic positioning member 310 is required to be in a compressed state in the frame 100, the mounting of the first frame 131 is still very smooth, and the first elastic positioning member 310 can be kept in a compressed state as desired after the mounting is completed. It can be seen that the assembling is very easy, thereby saving cost based on the above constructions.

Similarly, the opening of the second connecting portion 323 may be opposite to the mating face 201, which allows the second elastic positioning member 320 to be inserted into the second grooves 242 from the side close to the mounting face 202. Also, the gap between the second mounting portion 321 and the second abutting portion 322 is tapered towards the second connecting portion 323, with reference to FIG. 3 and FIGS. 13 and 14. It may lead, in the direction away from the mating face 201, to an increased size of the second elastic positioning member 320 in the first lateral direction Y-Y. In assembling, the housing 200 mounted with the second elastic positioning member 320 may be first seated on the second frame 132, and the limiting surface 120 may support the adapting portion 220 and the second elastic positioning member 320 meanwhile. Then, the first frame 131 is mounted, during which the outer side of the second abutting portion 322 may guide for the first frame 131, so that the first frame 131 may be mounted in place smoothly. Even if the second elastic positioning member 320 is required to be in a compressed state in the frame 100, the mounting of the first frame 131 is still very smooth, and the second elastic positioning member 320 can be kept in a compressed state as desired after the mounting is completed. It can be seen that the assembling is very easy, thereby saving cost based on the above constructions.

Exemplarily, the first grooves 232 may be tightly close to the housing 200 along the second lateral direction X-X, such that a first space is formed between the pair of first protrusions 231 and at the side of the first grooves 232 opposed to the housing 200. The first abutting portion 312 is accommodated in the first space. Specifically, the first grooves 232 may extend to the surface of the first protrusions 231 facing the housing 200, so that the first grooves 232 is defined by the first protrusions 231 and the housing 200, as shown in FIG. 10. The first mounting portion 311 may be mounted in an inner space between the pair of first protrusions 231 which is closer to the housing 200. An outer space between the pair of first protrusions 231 which is distanced from the housing 200 may serve as the first space for accommodating the first abutting portion 312. When the gap between the housing 200 and the frame 100 becomes smaller where the first elastic positioning member 310 is located, the first abutting portion 312 gradually approaches the first mounting portion 311 until the first abutting portion 312 is very close to or attached to the first mounting portion 311. The first abutting portion 312 may be completely or partially accommodated in the first space. Ideally, the outer surface of the first abutting portion 312 may be flush with that of the first protrusions 231 when the first abutting portion 312 is completely accommodated in the first space, thereby saving the internal space of the floating connector. In this case, the first abutting portion 312 may abut against the first mounting portion 311. When the frame 100 has a given volume, the housing 200 may have a greater movable range in frame 100. Also, the first abutting portion 312 may be suitable for the first space in shape.

Similarly, the second grooves 242 may be tightly close to the housing 200 along the first lateral direction Y-Y, such that a second space is formed between the pair of second protrusions 241 and at the side of the second grooves 242 opposed to the housing 200. The second abutting portion 322 is accommodated in the second space. Specifically, the second grooves 242 may extend to the surface of the second protrusions 241 facing the housing 200, so that the second grooves 242 is defined by the first protrusions 241 and the housing 200, as shown in FIG. 9. The second mounting portion 321 may be mounted in an inner space between the pair of second protrusions 241 which is closer to the housing 200. An outer space between the pair of second protrusions 241 which is distanced from the housing 200 may serve as the second space for accommodating the second abutting portion 322. When the gap between the housing 200 and the frame 100 becomes smaller where the second elastic positioning member 320 is located, the second abutting portion 322 gradually approaches the second mounting portion 321 until second first abutting portion 322 is very close to or attached to the second mounting portion 321. The second abutting portion 322 may be completely or partially accommodated in the second space. Ideally, the outer surface of the second abutting portion 322 may be flush with that of the second protrusions 241 when the second abutting portion 322 is completely accommodated in the second space, thereby saving the internal space of the floating connector. In this case, the second abutting portion 322 may abut against the second mounting portion 321. When the frame 100 has a given volume, the housing 200 may have a greater movable range in frame 100. Also, the second abutting portion 322 may be suitable for the accommodating space in shape.

The assembling process of the floating connector is exemplarily described below with an example of the floating connector provided above.

Figure 15:
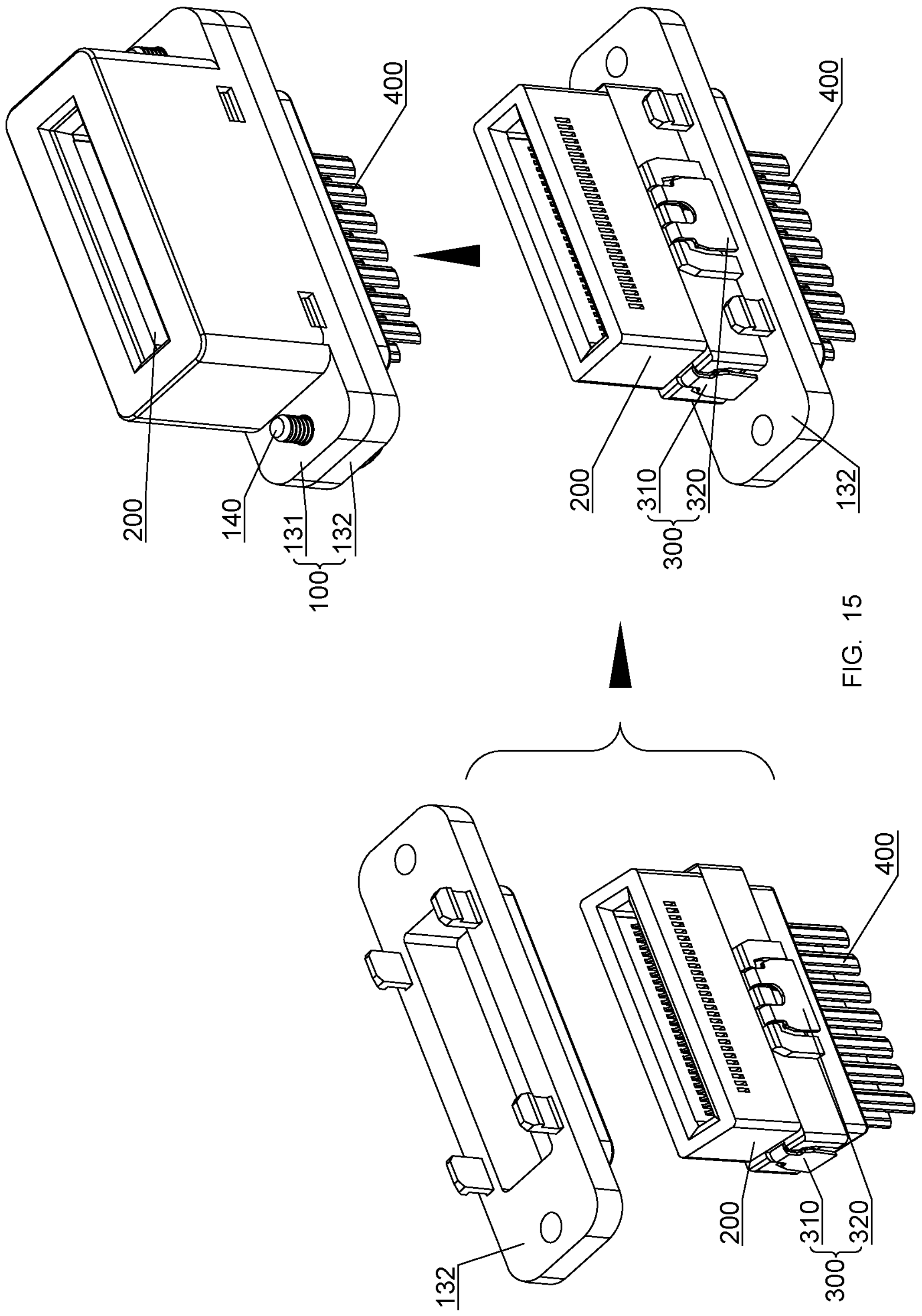
FIG. 15 is a schematic view showing the assembling of a floating connector, according to some embodiments.

As shown in FIG. 15, arrows schematically show the sequence for assembling the floating connector. First, the conductors 400 and the elastic positioner 300 is mounted to the housing 200. The conductors 400 and the elastic positioner 300 may be mounted to the housing 200 in advance. It should be noted that the conductors 400 and the elastic positioner 300 may be mounted to the housing 200 in any suitable order. Then, the housing 200 with the conductors 400 and the elastic positioner 300 may be mounted to the second frame 132. Specifically, lower ends of the elastic positioner 300 and the housing 200 may abut against the limiting surface 120. Finally, the first frame 131 may be fastened to the second frame 132, thereby enclosing the housing 200 mounted with the conductor 400 and the elastic positioner 300. In this way, the assembling of the floating connector is completed.

According to some other embodiments of the present disclosure, an electronic assembly is further provided. The electronic assembly may include any one of the floating connectors described above and a circuit board. The frame 100 may be mounted on the circuit board in any suitable manner. The conductor tails 402 of the plurality of conductors 400 may be electrically connected to the circuit board. The conductor tail 402 may be configured to have a length that allows the housing 200 to move in the frame 100.

The present disclosure has been described through the above embodiments, but it should be understood that a variety of variations, modifications and improvements may be made by a person skilled in the art according to the teaching of the present disclosure, and these variations, modifications and improvements all fall within the spirit of the present disclosure and the claimed scope of protection of the present disclosure. The scope of protection of the present disclosure is defined by the appended claims and its equivalent scope. The above embodiments are only for the purpose of illustration and description, and are not intended to limit the present disclosure to the scope of the described embodiments.

In the description of the present disclosure, it is to be understood that orientation or positional relationships indicated by orientation words "front', "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" refer to the inside and outside relative to the contour of each component itself.

Various variations may be made to the structures illustrated and described herein. For example, the floating connector described above can have any suitable configuration, for example, configured as backplane connectors, daughter card connectors, stacking connectors, Mezzanine connectors, 110 connectors, chip sockets, Gen Z connectors, etc.

Moreover, although many creative aspects have been described above with reference to the vertical connectors, it should be understood that the aspects of the present disclosure are not limited to these. Any one of the creative features, whether alone or combined with one or more other creative features, can also be used for other types of card edge connectors, such as coplanar connectors, and the like.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

What is claimed is:

1. An electrical connector, comprising:

a frame comprising a first opening and a second opening;

a housing movably disposed in the frame, the housing comprising a mounting face and a mating face having a slot exposed by the first opening;

a first positioning member disposed between the frame and a first side of the housing;

a second positioning member disposed between the frame and a second side of the housing, the second side different from the first side; and a plurality of conductors held by the housing, each of the plurality of conductors having a mating end extending to the slot and a conductor tail extending out of the mounting face and exposed by the second opening and configured for cable termination.

2. The electrical connector according to claim 1, wherein:

the frame comprises a first surface;

the first opening is in the first surface; and the first surface is configured to restrict movements of the housing with respect to the first opening.

3. The electrical connector according to claim 1, wherein:

the frame comprises an inner wall having a limiting surface;

the housing has an adapting portion; and the adapting portion and the limiting surface are configured to restrict movements of the housing with respect to the second opening.

4. The electrical connector according to claim 1, wherein:

the conductor tails of the plurality of conductors are flexible.

5. The electrical connector according to claim 1, wherein:

the housing comprises a side surface having a first positioning member receiver; and the first positioning member is disposed in the first positioning member receiver.

6. The electrical connector according to claim 5, wherein:

the first positioning member receiver comprises a pair of protrusions spaced apart, the pair of protrusions having respective grooves opposite to each other; and the first positioning member comprises a mounting portion, an abutting portion, and a connecting portion, the mounting portion and the abutting portion connected by the connecting portion, two sides of the mounting portion inserted into the grooves of the first positioning member receiver respectively, the abutting portion facing the frame.

7. The electrical connector according to claim 6, comprising:

a second positioning member receiver comprising a pair of protrusions spaced apart and a reinforcing groove disposed between the pair of protrusions, the pair of protrusions having respective grooves opposite to each other, wherein:

the second positioning member includes a mounting portion having a reinforcing opening, an abutting portion, and a connecting portion, the mounting portion and the abutting portion connected by the connecting portion, two sides of the mounting portion inserted into the grooves of the second positioning member receiver respectively, the abutting portion facing the frame, and an edge of the reinforcing opening is disposed in the reinforcing groove.

8. The electrical connector according to claim 3, wherein:

the frame comprises a first frame and a second frame;

the first frame and the second frame enclose a mounting cavity configured for accommodating the housing;

the first opening is in the first frame;

the second opening is in the second frame; and an inner sidewall of the second frame protrudes more into the mounting cavity than an inner sidewall of the first frame such that the limiting surface is formed by an end surface of the second frame facing the first frame.

9. The electrical connector according to claim 8, wherein:

the end surface of the second frame comprises a latch; and the first frame comprises a hole configured to engage the latch.

10. An electrical connector, comprising:

a frame comprising a first opening and a second opening;

a housing comprising a mating face exposed by the first opening, and a mounting face exposed by the second opening;

a plurality of conductors held by the housing, each of the plurality of conductors having a mating end extending adjacent the mating face and a conductor tail extending out of the mounting face and exposed by the second opening; and an elastic positioning member disposed between the housing and the frame.

11. The electrical connector according to claim 10, wherein:

the frame comprises an upper frame having the first opening and a lower frame having the second opening;

the upper frame and the lower frame are configured to be separable;

the upper frame has an upper mounting recess;

the lower frame has a lower mounting recess;

the upper mounting recess and the lower mounting recess together form a mounting cavity; and the housing is disposed in the mounting cavity.

12. The electrical connector according to claim 11, wherein:

a mouth of the lower mounting recess has a smaller size than that of the upper mounting recess such that the housing is supported by an edge of the lower frame.

13. The electrical connector according to claim 12, wherein:

a lower end of the elastic positioning member abuts against the edge of the lower frame.

14. The electrical connector according to claim 11, wherein:

a positioning member receiver is disposed on a side surface of the housing;

the elastic positioning member is disposed in the positioning member receiver; and the positioning member receiver is configured to limit the elastic positioning member from moving upwards.

15. The electrical connector according to claim 14, wherein:

the positioning member receiver comprises a pair of protrusions spaced apart;

the pair of protrusions comprise respective grooves opposite to each other; and the elastic positioning member comprises a mounting portion, an abutting portion, and a connecting portion, the mounting portion and the abutting portion connected by the connecting portion, two sides of the mounting portion inserted into the grooves respectively, the abutting portion facing the upper frame.

16. The electrical connector according to claim 15, wherein:

the mounting portion is mounted to the grooves in an upward direction;

a limiting barb is disposed between the pair of protrusions; and the mounting portion comprises a barb slot configured to engage the limiting barb such that the limiting barb limits the mounting portion from moving downward.

17. An electrical connector comprising:

a first frame configured to be mounted on a circuit board;

a second frame enclosing a mounting cavity;

a housing movably at least partially disposed in the mounting cavity, the housing comprising a mounting face and a mating face inside the mounting cavity; and a plurality of conductors held by the housing, each of the plurality of conductors having a mating end extending adjacent the mating face and a conductor tail extending out of the mounting face.

18. The electrical connector according to claim 17, wherein:

the conductor tails of the plurality of conductors have a length that allows the housing to move in the second frame.

19. The electrical connector according to claim 17, comprising:

a plurality of positioning members disposed between the housing and the second frame, wherein the plurality of positioning members are elastic.

20. An electronic assembly comprising:

the electrical connector according to claim 17; and a card fixedly mounted on the circuit board at a location separate from the first frame, the card comprising an edge inserted through the mating face of the housing.

* * * * *